(12) United States Patent
Roh et al.

(10) Patent No.: US 10,915,611 B2
(45) Date of Patent: Feb. 9, 2021

(54) CONTROL PROGRAM EXECUTION METHOD

(71) Applicant: LSIS CO., LTD., Anyang-si (KR)

(72) Inventors: Hee-Tae Roh, Anyang-si (KR);
Jae-Hwan Lim, Anyang-si (KR);
Choong-Kun Cho, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 16/614,568

(22) PCT Filed: Aug. 9, 2017

(86) PCT No.: PCT/KR2017/008627
§ 371 (c)(1),
(2) Date: Nov. 18, 2019

(87) PCT Pub. No.: WO2018/216854
PCT Pub. Date: Nov. 29, 2018

(65) Prior Publication Data
US 2020/0089846 A1    Mar. 19, 2020

(30) Foreign Application Priority Data

May 25, 2017  (KR) .................. 10-2017-0064922
May 25, 2017  (KR) .................. 10-2017-0064923
(Continued)

(51) Int. Cl.
*G06F 21/31*     (2013.01)
*H04M 1/725*    (2006.01)
*G06F 8/61*      (2018.01)

(52) U.S. Cl.
CPC ............... *G06F 21/31* (2013.01); *G06F 8/61* (2013.01); *H04M 1/72522* (2013.01); *H04M 1/72583* (2013.01)

(58) Field of Classification Search
CPC .......... G05B 2219/2614; G05B 19/042; G05B 19/4185; G05B 23/0283; G05B 17/02;
(Continued)

(56) References Cited

U.S. PATENT DOCUMENTS

2002/0059479 A1    5/2002  Hardy et al.
2003/0177440 A1    9/2003  Kegoya et al.
(Continued)

FOREIGN PATENT DOCUMENTS

JP    2008040737 A    2/2008
JP    2009065666 A    3/2009
(Continued)

OTHER PUBLICATIONS

International Search Report for related International Application No. PCT/KR2017/008627; report dated Nov. 29, 2019; (3 pages).
(Continued)

*Primary Examiner* — Kwasi Karikari
(74) *Attorney, Agent, or Firm* — K&L Gates LLP

(57) ABSTRACT

The present invention relates to a control program execution method. According to one embodiment of the present invention, the control program execution method performed in a terminal device in which a lower control program for managing a device to be controlled and/or an upper control program for executing the lower control program are installed comprises the steps of: receiving an input of an execution request for the upper control program from a user; searching for the device to be controlled, by the upper control program executed on the basis of the execution request; searching for the lower control program corresponding to identification information of the searched-for device to be controlled, by using the identification information; and connecting communication between the searched-for lower control program and the device to be controlled,
(Continued)

wherein the lower control program is sequentially executed after the upper control program is executed.

12 Claims, 16 Drawing Sheets

(30) Foreign Application Priority Data

May 25, 2017 (KR) .......................... 10-2017-0064924
May 25, 2017 (KR) .......................... 10-2017-0064925
May 25, 2017 (KR) .......................... 10-2017-0064926

(58) Field of Classification Search
CPC .............. G05B 19/0426; G05B 19/418; G05B 23/0221; G05B 23/0264; G05B 19/048; G05B 19/058; G05B 2219/14055; G05B 2219/14067; G05B 2219/32021; G05B 2219/32128; G05B 2219/34306; G05B 2219/40115; G05B 23/0286; G05B 23/0289; G05B 23/0291; G05B 23/0294; G05B 23/0297; H04L 12/282; H04L 41/16; H04L 41/22; H04L 43/16; H04L 63/083; H04W 84/18; H04W 52/028; H04W 12/12; H04W 24/08; H04W 4/38; H04W 52/02; H04W 88/02; H04W 88/06
See application file for complete search history.

(56) References Cited

U.S. PATENT DOCUMENTS

| | | | |
|---|---|---|---|
| 2011/0118896 A1* | 5/2011 | Holloway | .......... G05B 19/0428 700/300 |
| 2014/0351800 A1 | 11/2014 | Jao et al. | |
| 2015/0271161 A1 | 9/2015 | Katsuta | |
| 2016/0091217 A1* | 3/2016 | Verberkt | .................. F24F 11/30 700/276 |

FOREIGN PATENT DOCUMENTS

| | | |
|---|---|---|
| JP | 2013171388 A | 9/2013 |
| KR | 100734387 | 6/2007 |
| KR | 20140028163 A | 3/2014 |
| KR | 20140067186 A | 6/2014 |
| KR | 20150049500 A | 5/2015 |
| WO | 2005114344 A1 | 3/2008 |
| WO | 2007086475 A1 | 6/2009 |
| WO | 2014059271 A1 | 4/2014 |

OTHER PUBLICATIONS

Written Opinion for related International Application No. PCT/KR2017/008627; report dated Nov. 29, 2019; (5 pages).
European Search Report for related European Application No. 17910636.4; action dated Apr. 14, 2020; (9 pages).
Korean Office Action for related Korean Application No. 10-2017-0064926; action dated Aug. 31, 2020; (5 pages).

* cited by examiner

[FIG. 1]
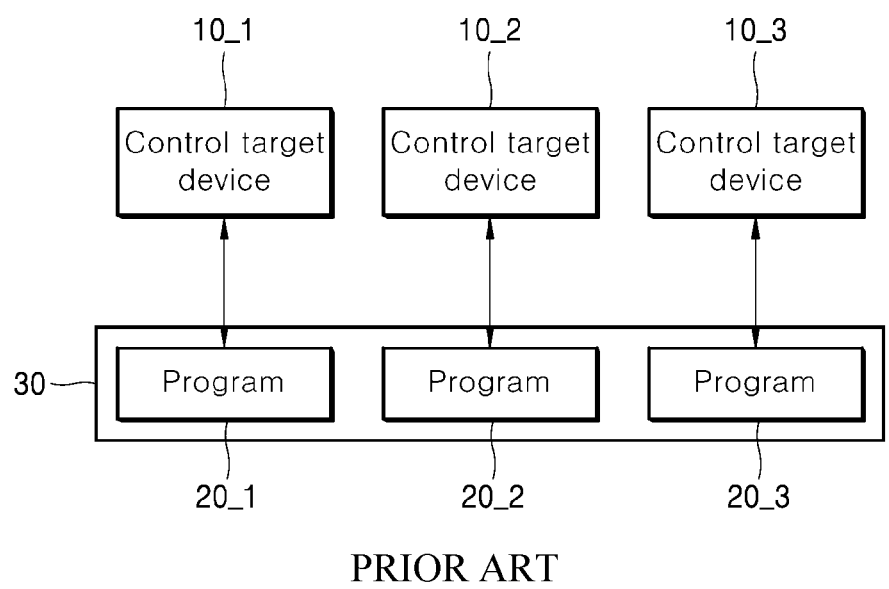
PRIOR ART

【FIG. 2】
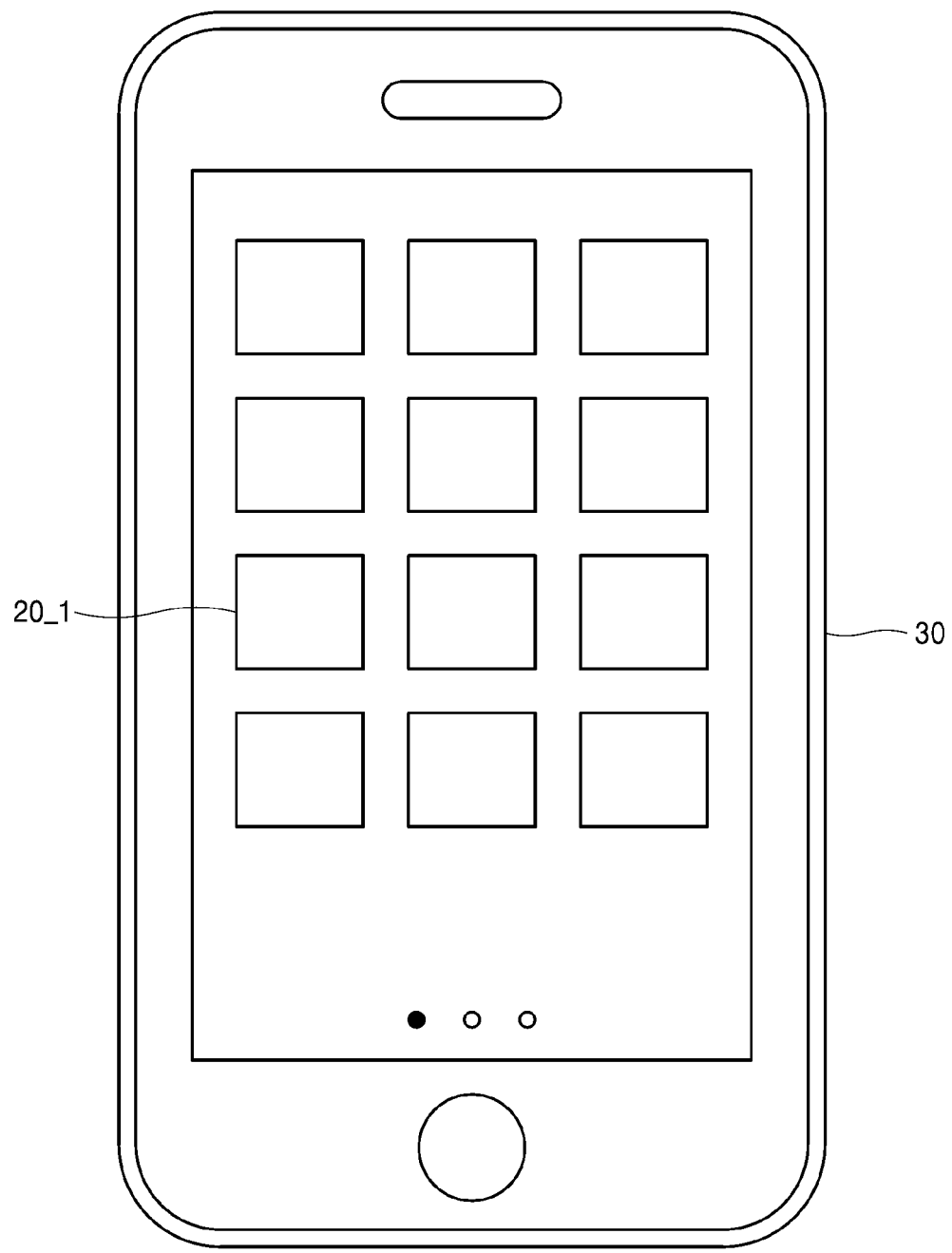
PRIOR ART

[FIG. 3]
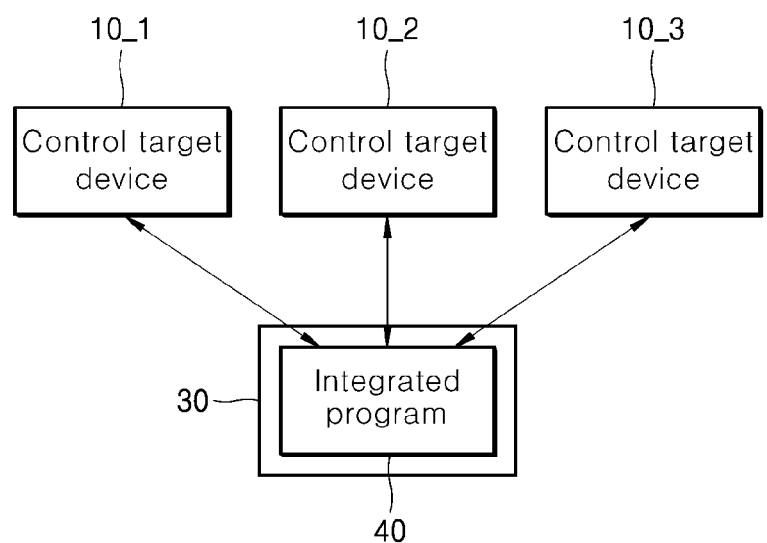
PRIOR ART

[FIG. 4]
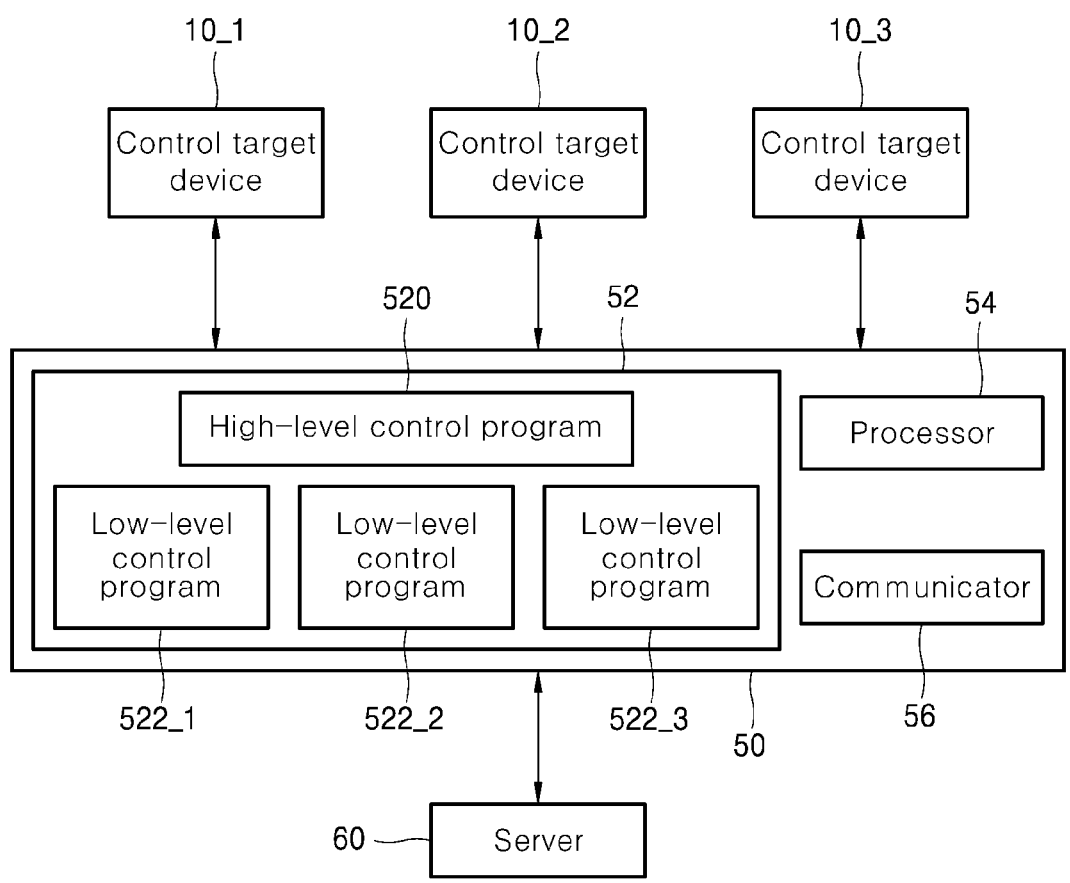

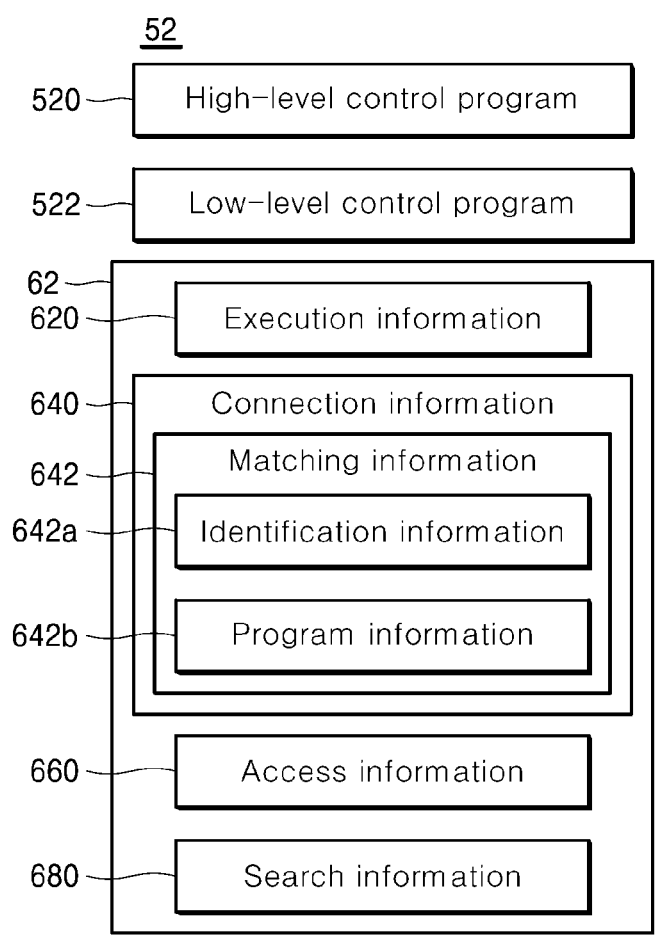
[FIG. 5]

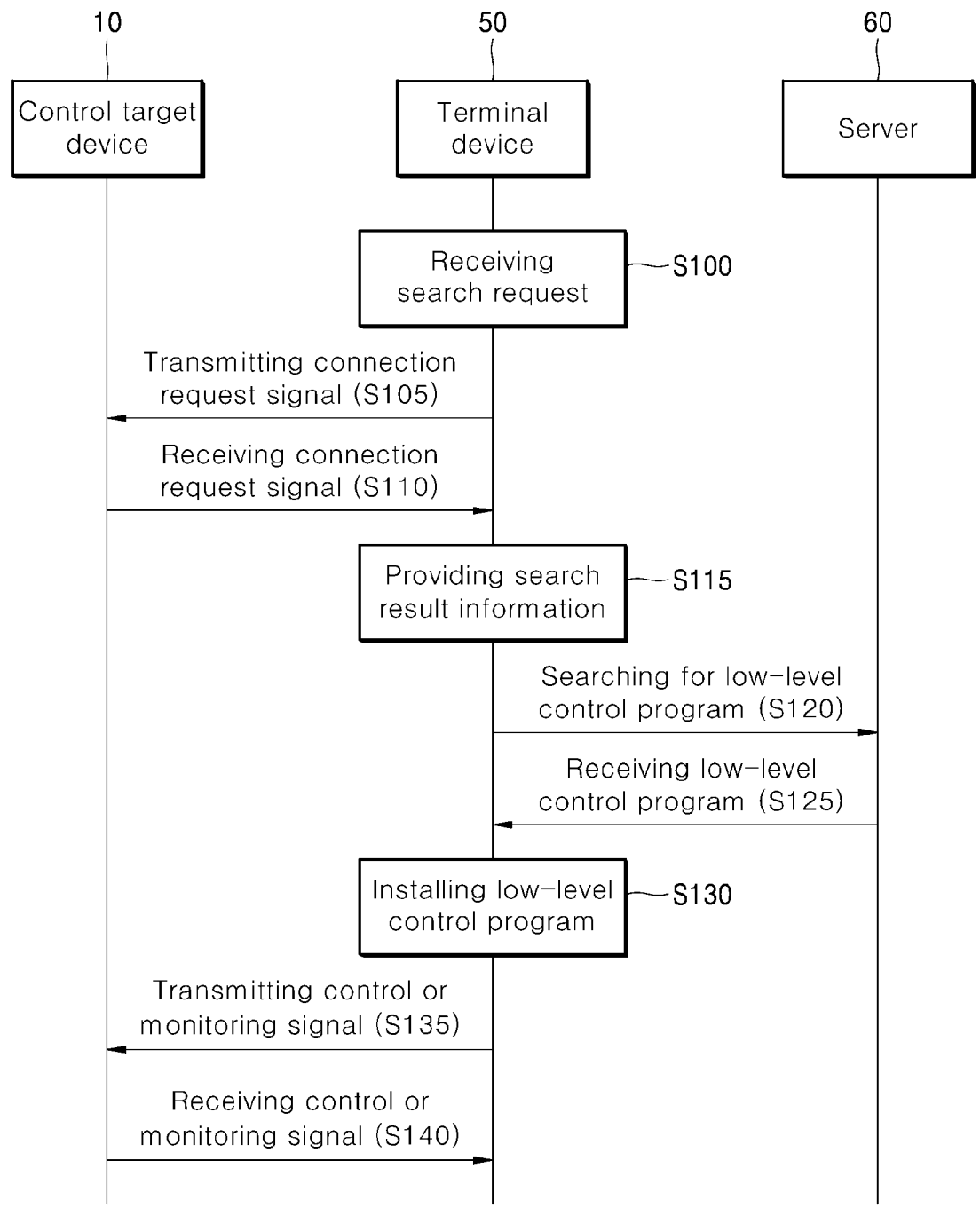

[FIG. 7]
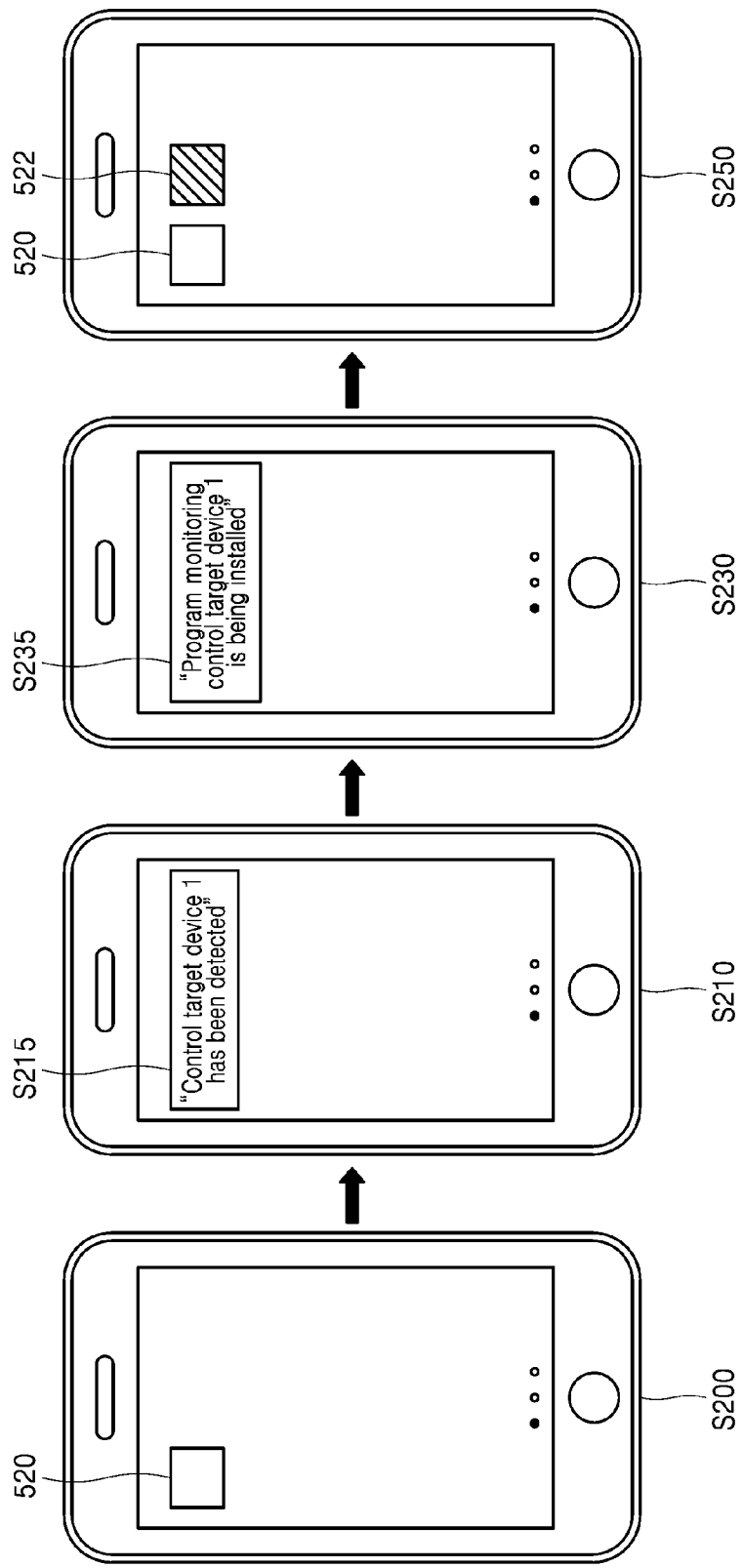

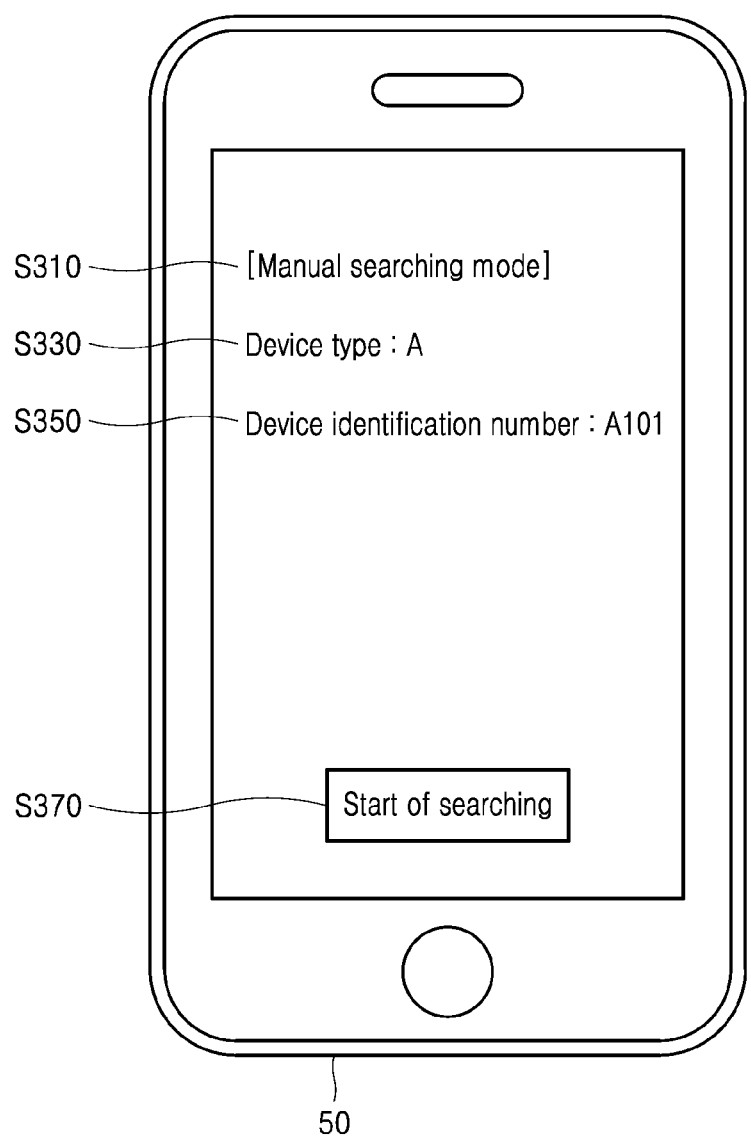

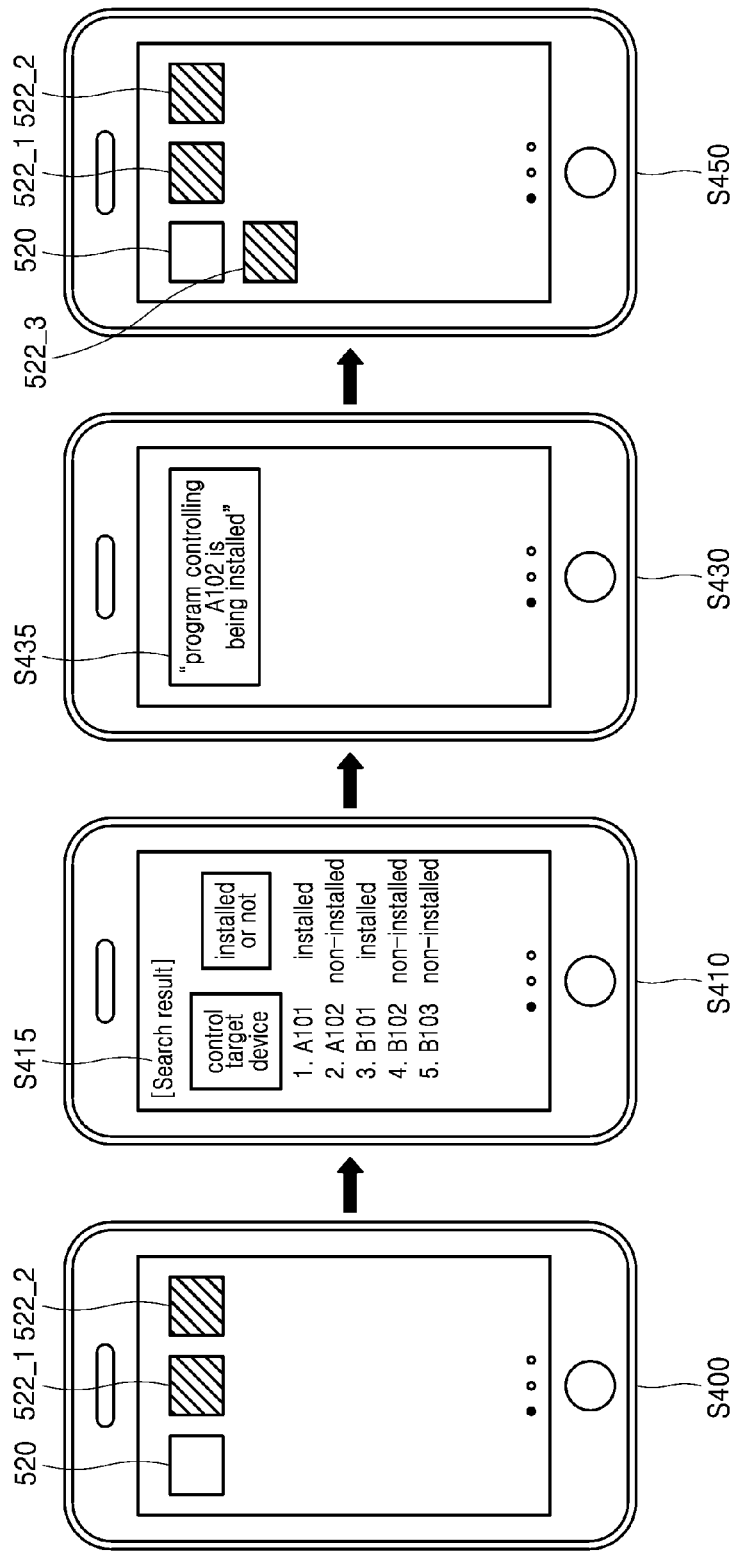

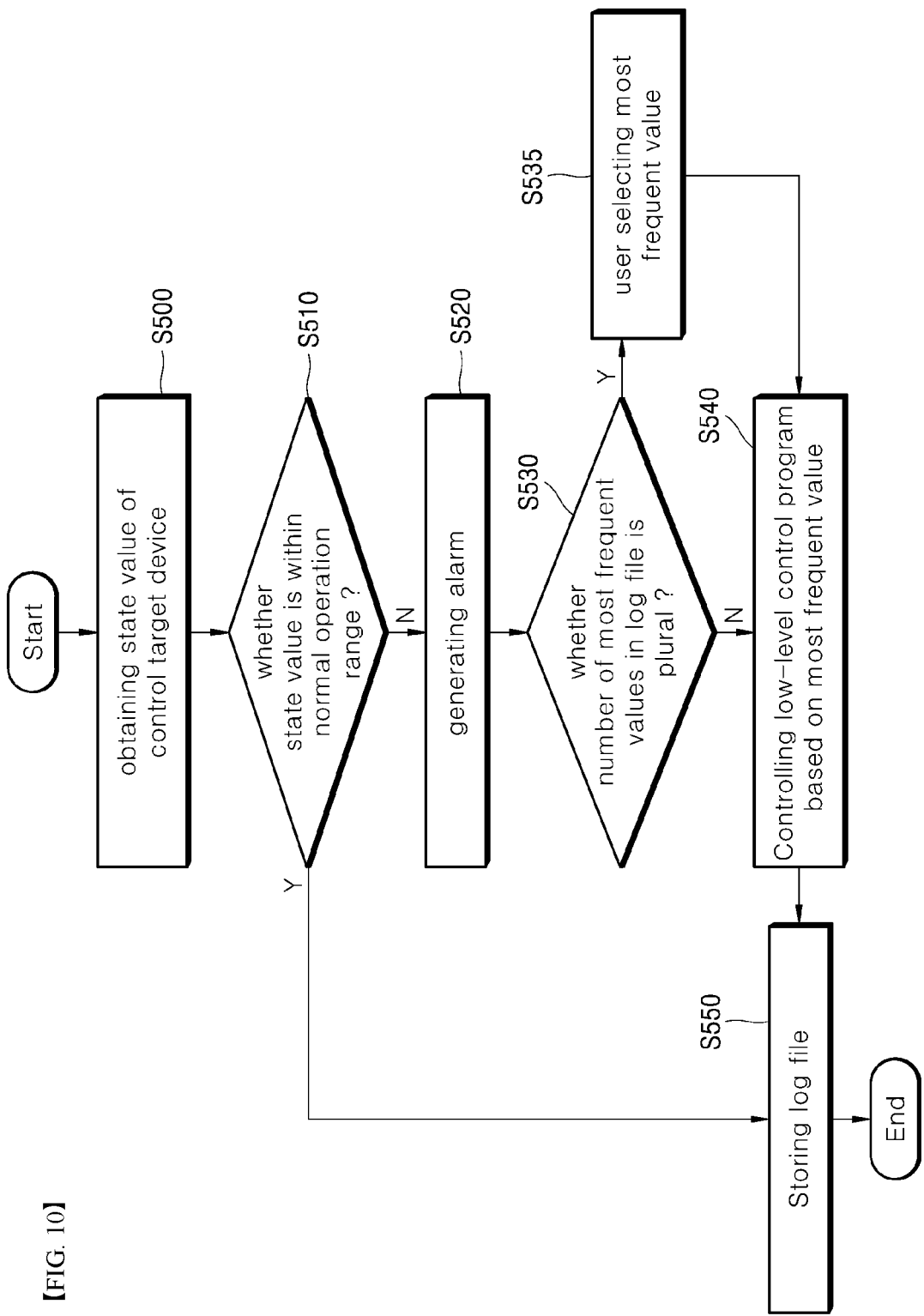
[FIG. 10]

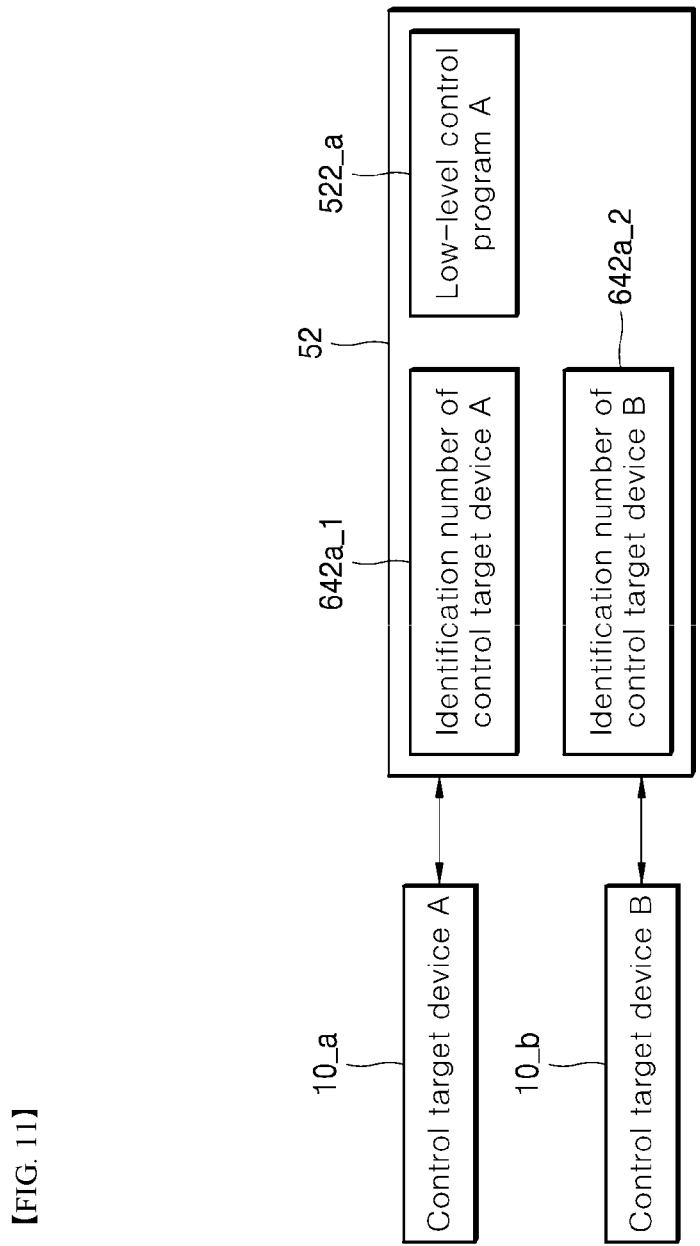

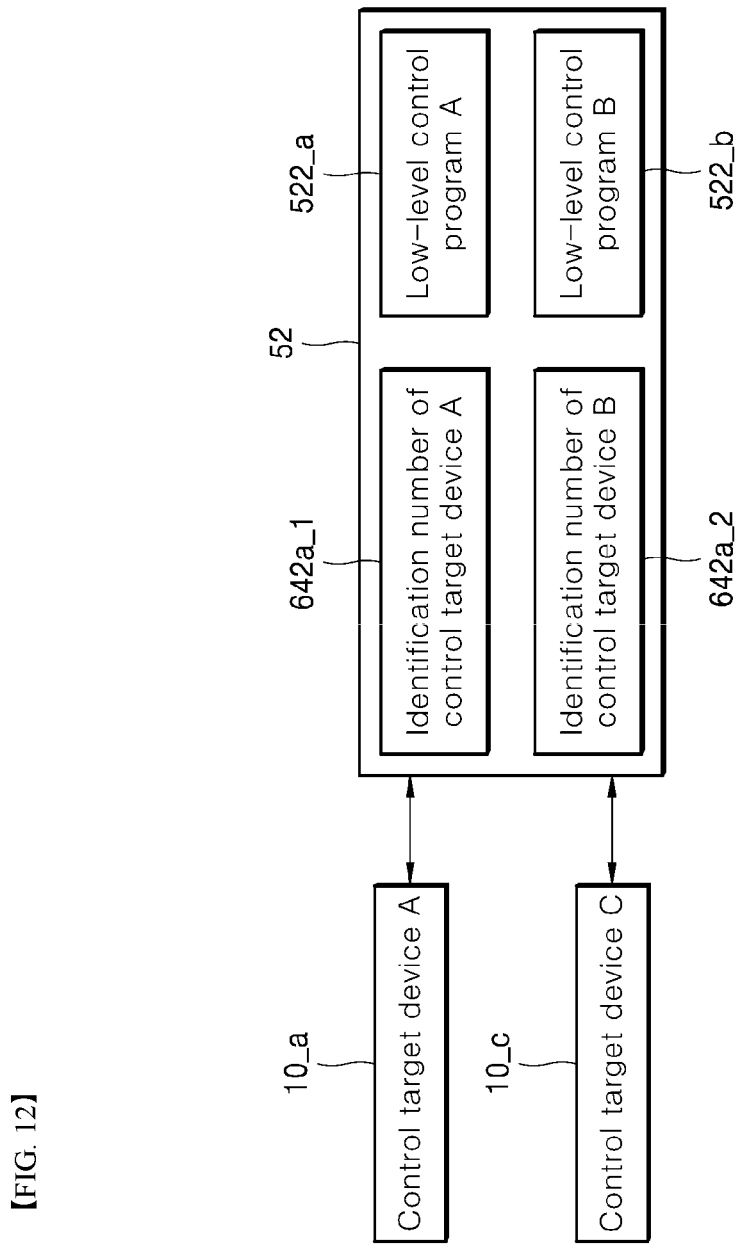

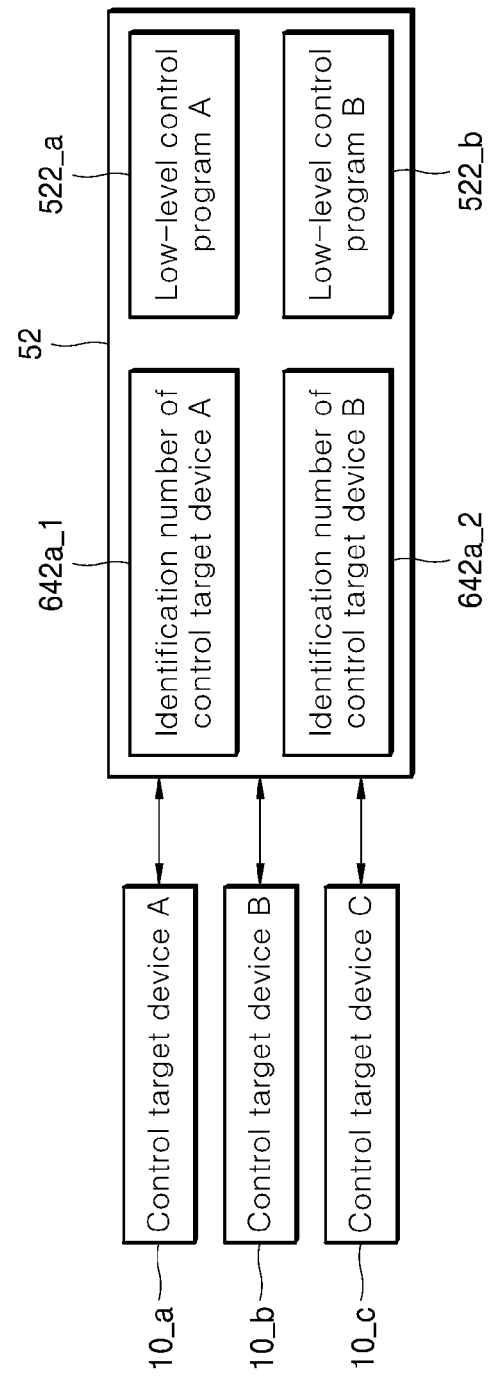
[FIG. 13]

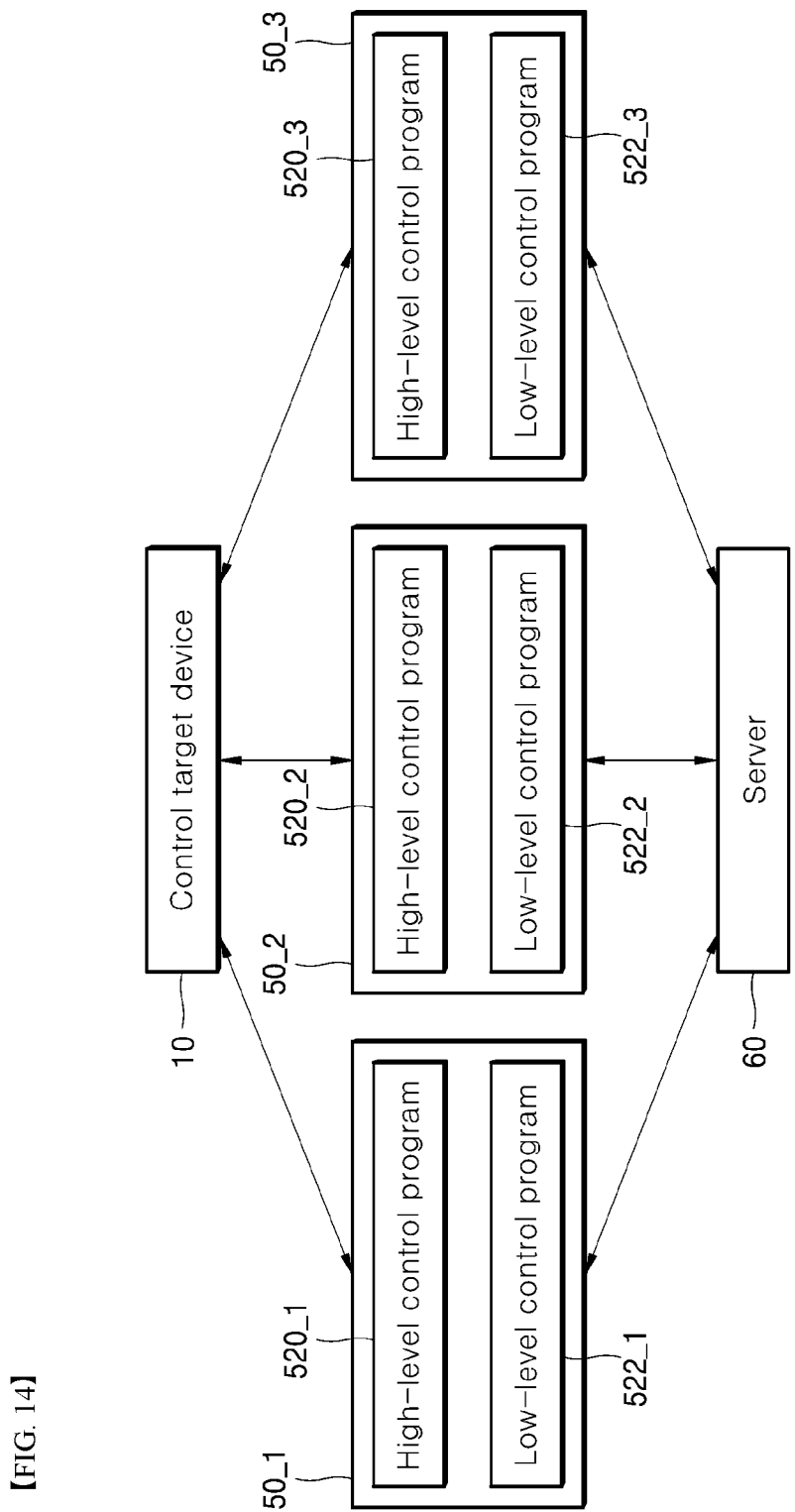
[FIG. 14]

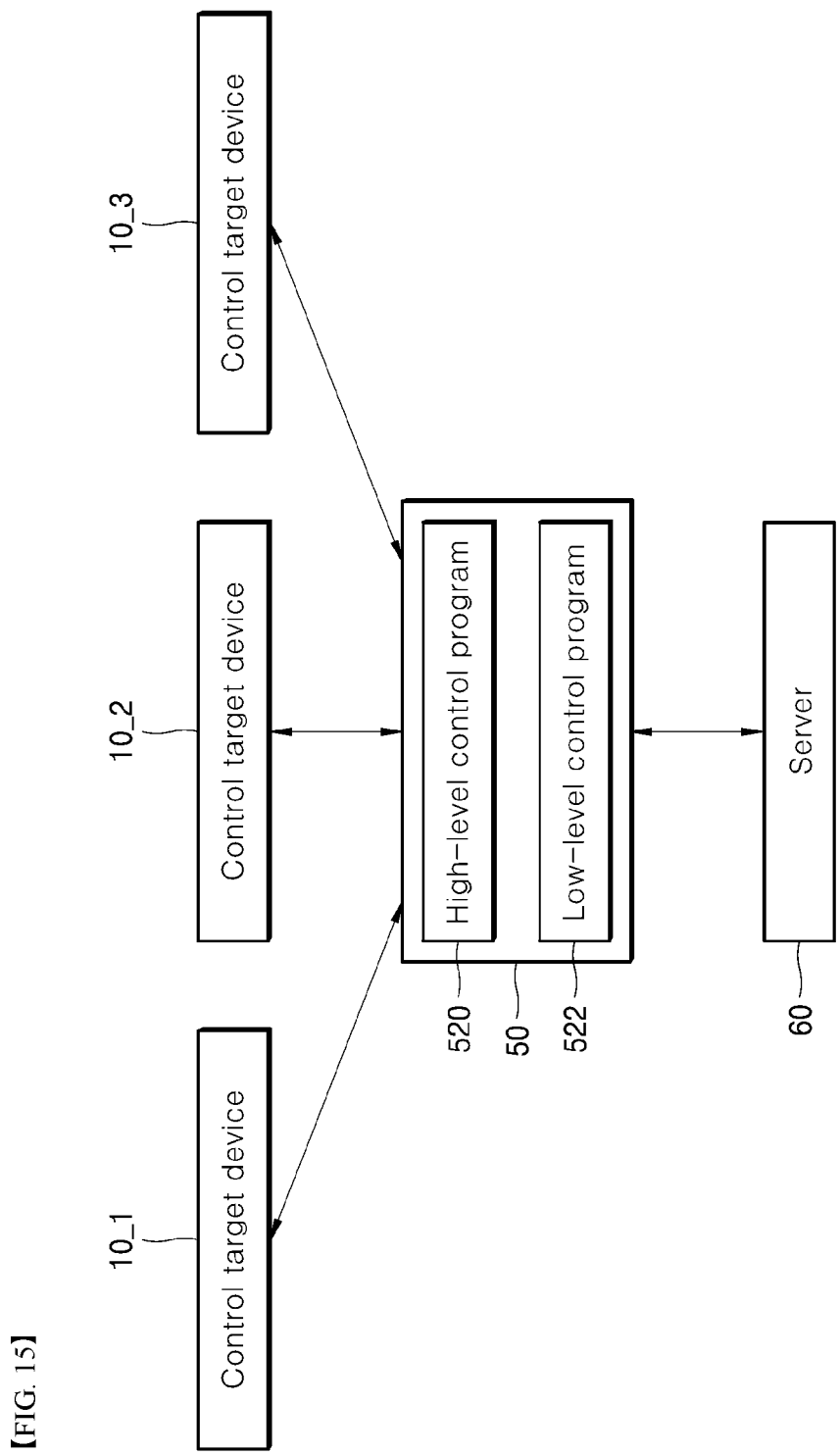
[FIG. 15]

[FIG. 16]
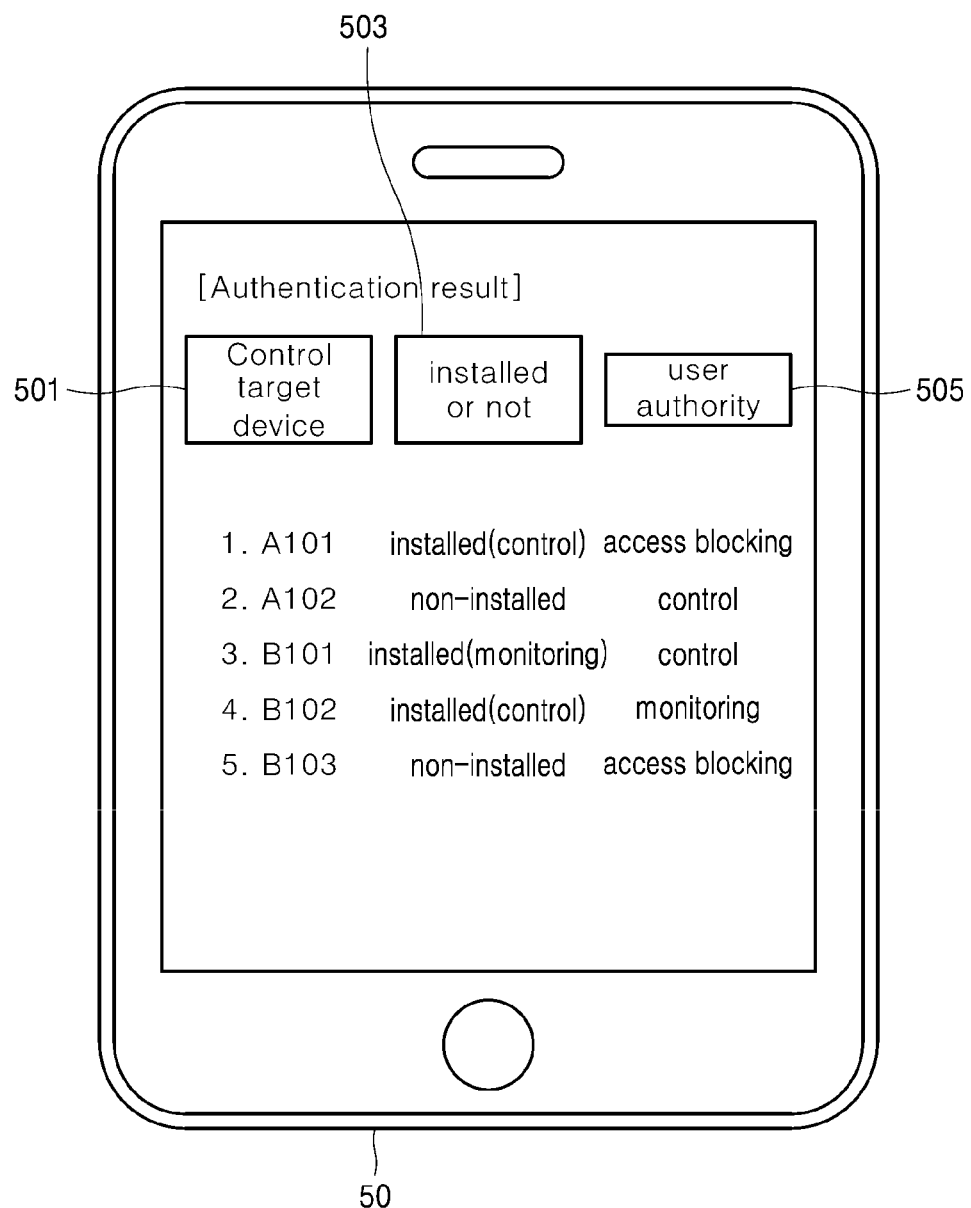

CONTROL PROGRAM EXECUTION METHOD

CROSS-REFERENCE TO RELATED APPLICATIONS

The present application is a National Stage of International Application No. PCT/KR2017/008627, filed on Aug. 9, 2017, which claims the benefit of earlier filing date and right of priority to Korean Application No. 10-2017-0064922 filed on May 25, 2017, Korean Application No. 10-2017-0064923, filed on May 25, 2017, Korean Application No. 10-2017-0064924, filed on May 25, 2017, Korean Application No. 10-2017-0064925 filed on May 25, 2017, and Korean Application No. 10-2017-0064926 filed on May 25, 2017, the contents of which are all hereby incorporated by reference herein in their entirety.

FIELD OF THE INVENTION

The present disclosure relates to a control program execution method.

BACKGROUND OF THE INVENTION

Description of Related Art

In order to control power devices or facilities installed at industrial sites, that is, control target devices, a control program exists that performs an appropriate management function for a corresponding device.

FIG. 1 illustrates a conventional individual program control method.

Referring to FIG. 1, conventionally, a program is managed by using an individual program control method. The individual program control method is configured for managing a corresponding control target device via a corresponding program by implementing a control function for the corresponding control target device using a corresponding program.

For example, a program 20_1 for a control target device 10_1 may perform a management function (that is, monitoring or control function) for a control target device 10_1. A program 20_2 for a control target device 10_2 may perform a management function for a control target device 10_2. A program 20_3 for a target device 103 may perform a management functions for a control target device 10_3.

However, when using the individual program control method shown in FIG. 1, in order to manage each control target device, a user needs to search for a control program corresponding to each control target device and install the program in a terminal device such as a computer or a smartphone. Thus, in a process of searching for the control program, it is difficult for the user to identify a type and model name of the control target device, or to determine which control program is a suitable program for the control target device.

Further, as the number of control target devices increases, the number of control programs to be installed increases. When the number of control programs increases, it is difficult for a user to identify whether a control program for a specific control target device is installed, causing a problem such as retrying installation of the control program that is already installed.

As the number of the control target devices that a user wants to manage increases, the number of programs proportional to the number of the control target devices need to be downloaded and installed in the terminal device 30. In this case, the number of the programs installed in the terminal device 30 increases, so that the number of icons of the programs displayed on the user terminal device 30 increases. In this connection, when the user views only the icons on the terminal device 30, it is difficult for the user to easily identify an icon for a program for managing a specific control target device.

Further, when the user's authority is set for each control program, a corresponding authority should be set separately for each control program. The user must remember the authority for a corresponding control program or control target device in order to manage the corresponding control target device.

In one example, when the number of the control programs installed in the terminal device increases, another problem may occur that it is difficult for the user to identify a location of an execution button or icon for executing a target control program or to identify a control target device corresponding to each installed control program.

When a control program is installed in the terminal device, and when the user searches for a control target device corresponding to the installed control program repeatedly, communication establishment between the control target device and the control program may be delayed, and overload may occur in the control program.

Further, when a control program installed in the terminal device is deleted or a new control target device different from a control target device corresponding to the control program stored in the terminal device is to be managed, another problem may occur that it is difficult for the user to identify which control program has been deleted or which control target device has been newly added.

FIG. 2 shows icons displayed on a terminal device 30 with a conventional low-level control program installed therein.

Although the terminal device 30 has a program 20_1 managing a control target device 10_1 installed therein, it is difficult for the user to easily identify an icon representing the program 20_1 managing the control target device 10_1 from among a plurality of icons.

Further, in some cases, the icon for the program 20_1 could not be found, and thus the program 20_1 may be reinstalled. As such, the user in FIG. 2 needs to know in advance what icons represent the programs 20_1, 202, and 20_3 that manage the control target devices 10_1, 102, and 10_3 respectively. That is, it is inconvenient for the user to know in advance an icon indicating the corresponding program or where the icon is placed.

Further, when a control program managing a specific control target device is updated, it is difficult for the user to identify the control program that needs to be updated individually, or to easily update the control program.

To solve those problems, an integrated program control method may be used. FIG. 3 illustrates a conventional integrated program control method.

The conventional integrated program control method illustrated in FIG. 3 is configured for managing a plurality of control target devices via an integrated program 40 by implementing a management function for control target devices using an integrated program 40.

For example, when a control target device 10_1, control target device 102, and control target device 10_3 are present, the integrated program 40 may perform all of a function for managing the control target device 10_1, a function for managing the control target device 10_2, and a function for managing the control target device 10_3.

When using the integrated program control method shown in FIG. 3, and when the user manages only a specific control target device among the control target devices, the integrated program 40 should be installed on the terminal device 30. Thus, there is an inefficient problem in that a function for managing a control target device not desired by the user should be installed into the terminal device 30.

For example, when the control target device 10_1, the control target device 102, and the control target device 10_3 exist, and a control target device managed by the user is the control target device 10_1, the integrated program 40 should be installed into the terminal device 30. Thus, the terminal device 30 should have a function for managing the control target device 10_1, a function for managing the control target device 10_2, and a function for managing the control target device 10_3. In this connection, since the control target device managed by the user is the control target device 10_1, only the function for managing the control target device 10_1 is used in the integrated program 40. The function for managing the control target device 10_2 and the function for managing the control target device 10_3 are not used in the integrated program 40 and thus a memory of the terminal device 30 is inefficiently used.

Further, when the user's authority is set for the integrated program 40, there is a problem that it is difficult for the user to set or manage authority for each control program for each control target device or for each control program function.

Further, the integrated program 40 may be updated whenever a function for managing each control target device is updated or at a specific time spacing. As such, when all functions for managing the control target devices 10_1, 10_2, and 10_3 are implemented as in the integrated program 40, the functions implemented in the integrated program 40 may be various. Thus, the number of updates is so high that the user has to update the integrated program 40 whenever the functions of the integrated program 40 are updated.

For example, when the integrated program 40 implements the functions for managing the control target device 10_1, the control target device 102, and the control target device 103, respectively, and when the function of the control target device 10_1 is updated, the integrated program 40 needs to be updated. When the function of the control target device 102 is updated, the integrated program 40 needs to be updated. Further, when the function of control target device 10_3 is updated, the integrated program 40 must be updated.

When using the conventional individual program control method shown in FIG. 1 or the conventional integrated program control method shown in FIG. 3, the user has to control the control program directly based on a change of a state value of the control target device, for example, a change of a current value, voltage value, power value or frequency value thereof.

Further, when the control target device has the same state value, a control program corresponding thereto may be controlled differently by different users or terminal devices.

BRIEF SUMMARY OF THE INVENTION

One purpose of the present disclosure is to provide a control program execution method that allows a user to easily install a control program suitable for each control target device without the user directly identifying a type of the control target device or control program.

Further, another purpose of the present disclosure is to provide a control program execution method that allows a user to easily identify whether each control program is installed or a location of an execution button or icon of each control program as the number of control programs as installed increases.

Further, another purpose of the present disclosure is to provide a control program execution method that may easily set an user's authority for each control program or each function of each control program.

Further, another purpose of the present disclosure is to provide a control program execution method that may facilitate management of a user's authority over a plurality of control programs.

Further, another purpose of the present disclosure is to provide a control program execution method that may quickly establish communication between a control target device and a corresponding control program without repeatedly searching for the control program as installed and the corresponding control target device.

Further, another purpose of the present disclosure is to provide a control program execution method in which when a control program is deleted from a terminal device or a user wishes to manage a new control target device, a control program suitable for the control target device may be easily installed on the terminal device.

Further, another purpose of the present disclosure is to provide a control program execution method which may identify whether updating of the control program corresponding to each control target device is required, and when so, may easily update the control program.

Further, another purpose of the present disclosure is to provide a control program execution method allows the user to quickly identify a control target device corresponding to the installed control program, and to easily execute the control program.

Further, another purpose of the present disclosure is to provide a control program execution method which may identify whether a control target device is in a normal operation state based on a change in a state value of the control target device, and may easily control the control program.

Further, another purpose of the present disclosure is to provide a control program execution method which may execute a plurality of control programs whose execution order is defined.

Further, another purpose of the present disclosure is to provide a control program execution method that may control a control program appropriately depending on a state value of a control target device.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

One aspect of the present disclosure provides a method for executing a control program by a terminal device, wherein at least one of a low-level control program for managing a control target device or a high-level control program for executing the low-level control program is included in the terminal device, wherein the method comprises: receiving an execution request of a high-level control program from a user; executing the high-level control program in response to the execution request and searching for a control target device by the high-level control program; receiving identification information of the searched control target device, and searching for a low-level control program corresponding to the identification information; and establishing communication between the searched low-level control program and the searched control target device, wherein the high-level control program is first executed and then the low-level control program is executed.

In one implementation, receiving the execution request of the high-level control program includes: performing user authentication based on authentication information received from the user; obtaining authority information of the user for which authentication has been completed; and managing the low-level control program based on the obtained authority information.

In one implementation, the method further comprises: when the high-level control program obtains the authority information of the user, providing, from the high-level control program to the terminal device, identification information of the low-level control program corresponding to the authority information, and identification information of the control target device corresponding to the authority information.

In one implementation, searching for the control target device includes: acquiring the identification information pre-stored in the terminal device; and receiving the identification information from the control target device.

In one implementation, receiving the identification information from the control target device includes: receiving a search request for the control target device from the user; and transmitting a connection request signal to the control target device in response to the search request.

In one implementation, the method further comprises: generating, by the control target device, the identification information based on the connection request signal; and transmitting, by the control target device, the identification information to the terminal device.

In one implementation, searching for the low-level control program includes: searching the low-level control program pre-stored in the terminal device; acquiring the low-level control program from the terminal device or a server; and installing the acquired low-level control program into the terminal device.

In one implementation, the method further comprises providing search result information including the identification information of the searched control target device, installation information of the low-level control program corresponding to the control target device, or update information of the low-level control program.

In one implementation, the method further comprises updating the low-level control program based on the update information in the search result information, or installing or executing the low-level control program based on the installation information in the search result information.

In one implementation, the method further comprises: acquiring a state value of the control target device by the low-level control program; determining, by the low-level control program, whether the state value is contained in a predefined normal operation range; and upon determination by the low-level control program that the state value is out of the normal operation range, reporting, by the low-level control program, to the high-level control program that the control target device is in an abnormal state.

In one implementation, the method further comprises: identifying, by the high-level control program, whether the state value is outside a predetermined error range from the normal operation range; and generating, by the high-level control program, an alarm when the state value is out of the error range.

In one implementation, the method further comprises: differently setting, by the high-level control program, whether the alarm is generated or the normal operation range or the error range for different users, and based on login information of the users logged into the high-level control program.

In one implementation, the method further comprises: when the state value is outside the normal operation range, managing, by the high-level control program, the low-level control program based on a most frequent value in a log file of the low-level control program.

According to the present disclosure, a user may easily install a control program suitable for each control target device without directly identifying a type of the control target device or the control program.

Further, in accordance with the present disclosure, a user may easily identify whether each control program is installed or a location of an execution button or icon of each control program as the number of control programs as installed increases.

Further, in accordance with the present disclosure, the control program execution method may easily set an user's authority for each control program or each function of each control program.

Further, in accordance with the present disclosure, the control program execution method may facilitate management of a user's authority over a plurality of control programs.

Further, in accordance with the present disclosure, the control program execution method may quickly establish communication between a control target device and a corresponding control program without repeatedly searching for the control program as installed and the corresponding control target device.

Further, in accordance with the present disclosure, when a control program is deleted from a terminal device or a user wishes to manage a new control target device, a control program suitable for the control target device may be easily installed on the terminal device.

Further, in accordance with the present disclosure, the control program execution method may identify whether updating of the control program corresponding to each control target device is required, and when so, may easily update the control program.

Further, in accordance with the present disclosure, a user may quickly identify a control target device corresponding to the installed control program, and easily execute the control program.

Further, in accordance with the present disclosure, the control program execution method may identify whether a control target device is in a normal operation state based on a change in a state value of the control target device, and may easily control the control program.

Further, in accordance with the present disclosure, a control program execution method may execute a plurality of control programs whose execution order is defined.

Further, in accordance with the present disclosure, the control program execution method may control a control program appropriately depending on a state value of a control target device.

Specific effects of the present disclosure in addition to the above effects will be described together with specific details for carrying out the present disclosure.

BRIEF DESCRIPTION OF DRAWINGS

FIG. 1 illustrates a conventional individual program control method.

FIG. 2 shows icons displayed on a terminal device with a conventional low-level control program installed therein.

FIG. 3 illustrates a conventional integrated program control method.

FIG. 4 illustrates a terminal device and a program control system including the terminal device according to an embodiment of the present disclosure.

FIG. 5 shows a configuration of a program and related data stored in a memory of FIG. 4.

FIG. 6 is a flow chart of execution of a high-level control program implemented using a terminal device according to one embodiment of the present disclosure.

FIG. 7 illustrates an execution process of a high-level control program implemented using a terminal device according to some embodiments of the present disclosure.

FIG. 8 is a diagram for describing a process of executing a high-level control program implemented using a terminal device according to an embodiment of the present disclosure.

FIG. 9 illustrates an execution process of a high-level control program implemented using a terminal device according to another embodiment of the present disclosure.

FIG. 10 is a flowchart of an execution of a high-level control program and a low-level control program as implemented using a terminal device according to an embodiment of the present disclosure.

FIG. 11 illustrates an establishment process of communication between a control target device and a low-level control program as implemented using a terminal device according to some embodiments of the present disclosure.

FIG. 12 is a diagram for describing an establishment process of communication between a control target device and a low-level control program as implemented using a terminal device according to an embodiment of the present disclosure.

FIG. 13 is a diagram for describing an establishment process of communication between a control target device and a low-level control program as implemented using a terminal device according to another embodiment of the present disclosure.

FIG. 14 illustrates an execution process of a high-level control program as implemented using a terminal device according to another embodiment of the present disclosure.

FIG. 15 is a diagram for describing a process of executing a high-level control program as implemented using a terminal device according to another embodiment of the present disclosure.

FIG. 16 illustrates an execution process of a high-level control program as implemented using a terminal device according to another embodiment of the present disclosure.

DETAILED DESCRIPTION OF THE INVENTION

The above objects, features and advantages are described in detail below with reference to the accompanying drawings. Accordingly, a person having ordinary knowledge in the technical field to which the present disclosure belongs may easily implement a technical idea of the present disclosure. In describing the present disclosure, when it is determined that detailed descriptions of known components and methods related to the present disclosure may unnecessarily obscure a gist of the present disclosure, the detailed descriptions thereof will be omitted. Hereinafter, exemplary embodiments of the present disclosure will be described in detail with reference to the accompanying drawings. In the drawings, the same reference numerals are used to indicate the same or similar components.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a control program execution method according to some embodiments of the present disclosure will be described with reference to FIGS. 4 to 16. For reference, as used herein, when a common or general description of a plurality of control target devices 10_1 to 10_3 is made, this description is directed to a control target device 10.

FIG. 4 illustrates a terminal device and a program control system including the terminal device according to an embodiment of the present disclosure.

Referring to FIG. 4, a terminal device 50 according to an embodiment of the present disclosure may include a memory 52, a processor 54, and a communicator 56. The memory 52 may include a high-level control program 520 and a low-level control program 522_1 to 522_3.

The memory 52 may include a dynamic storage device that stores dynamic information and instructions for execution by a processor 54, such as RAM (Random Access Memory).

Further, the memory 52 may include a static storage device that stores static information and instructions for use by the processor 54, such as ROM (Read Only Memory). The memory 52 may be embodied as a volatile memory unit or a nonvolatile memory unit. The memory 52 may be of another type of a computer readable medium, such as a magnetic disk or optical disc.

The processor 54 may include any type of a conventional processor, a microprocessor, or a processing logic to interpret and execute instructions.

The processor 54 may execute instructions stored in the memory 52 to display graphics information for a graphical user interface (GUI) on an external input/output device, such as a display coupled to a high speed interface.

In another embodiment of the present disclosure, multiple processors may be used together with multiple memories. In some embodiments, the processor 54 may be transformed into a special purpose microprocessor by executing or executing computer executable instructions.

The communicator 65 may include a module or program that communicates with external devices. For example, the communicator 65 may communicate with the control target device 10 with reference to connection information 640 received from the control target device 10.

A communication protocol used for communication between the communicator 65 and a server 60 or the control target device 10 may include, for example, CDMA (Code Division Multiple Access) communication, WCDMA (Wideband Code Division Multiple Access) communication, or broadband wireless communication protocol. In this connection, a wireless communication network may include WLAN, Wi-Fi, WiBro Wireless Broadband (Wibro), WiMAX (World Interoperability for Microwave Access), HSDPA (High Speed Downlink Packet Access), Long Term Evolution (LTE), IEEE802.16, Wireless Mobile Broadband Service (WMBS), and the like.

Further, a short-range wireless communication network may include beacon, Bluetooth, RFID (Radio Frequency Identification), Infrared Data Association (IrDA), UWB (Ultra Wideband), Zigbee, and Z-Wave. However, the present disclosure is not limited thereto.

The control target device 10 may include industrial equipment or an industrial control target device such as a power device measuring a power value. For example, the control target device 10 may include an MCCB (Molded Case Circuit Breaker), an MCB (Miniature circuit breaker), an ACB (Air Circuit Breaker), a VCB (Vacuum circuit breaker), a digital relay, or a PLC (programmable logic controller). However, the present disclosure is not limited thereto.

The control target device 10 may include a communication module that provides communication between the control target device 10 and the terminal device 50. Specifically, the communication module may be embedded in the control target device 10 when implemented in a built-in type, or may be attached to or detached from an exterior part of the control target device 10 when implemented in an external form.

In one embodiment of the present disclosure, when the communication module is built-in, the module may be fixed inside the specific control target device 10 to provide communication between the control target device 10 and the terminal device 50. Specifically, the communication module may receive control target device information from the control target device 10 whenever the module is connected to the control target device 10 and then store the control target device information in a memory inside the communication module. For example, the control target device information may include a type of the control target device and identification information of the control target device.

The communication module may provide the control target device information to the terminal device 50 which may in turn provide, to the server 60, connection information 640 together with the control target device information. The connection information may refer to connection data for connection between the control target device 10 and the low-level control program). Then, the server 60 may provide the connection data may store control target device information-based connection information 640. This process will be described in more detail with reference to following descriptions of the terminal device 50 and server 60.

The terminal device 50 may include a device for executing a program that may manage the control target device 10 among the plurality of programs when the terminal device is connected with the control target device 10. For example, the terminal device 50 may be embodied as one of various components of an electronic device such a computer, UMPC (Ultra Mobile PC), workstation, netbook, PDA (Personal Digital Assistant), portable computer, web tablet, wireless phone, mobile phone, a smart phone, an e-book, a PMP (portable multimedia player), a portable game console, a navigation device, a black box or a digital camera. However, the present disclosure is not limited thereto.

In the terminal device 50, there may be installed a high-level control program 520 and a low-level control program 522 connecting a specific control target device 10 among the control target devices and a corresponding specific program. For example, when the low-level control program 522 is installed in the terminal device 50 and executed by the high-level control program 520, the low-level control program 522 may communication with the specific control target device 10 and manage the specific control target device 10.

The high-level control program 520 may acquire the low-level control program 522 stored in the server 60 from the server 60 automatically or via a command received from the user and install the low-level control program 522 in the memory 52 of the terminal device 50.

The high-level control program 520 may establish the communication between the control target device and the low-level control program using identification information of the control target device stored in the memory 52 in advance.

The high-level control program 520 may identify whether communication establishment between the control target device and the low-level control program is established and when the communication is not established, may search for the control target device or acquire the low-level control program.

When the communication between the low-level control program installed in memory 52 and the control target device has been established, the high-level control program 520 may execute the low-level control program.

Further, the high-level control program 520 may search for the low-level control program 522 stored in the terminal device 50 either automatically or via a command received from the user and may install the low-level control program 522 obtained via the search in the memory 52 of the terminal device 50.

The high-level control program 520 may be executed upon receiving a user's motion. In this connection, the motion of the user for executing the high-level control program 520 may include touching, or clicking with a mouse, an icon corresponding to the high-level control program 520 and displayed on the display of the terminal device 50 or clicking a button contained on the terminal device 50 and corresponding to the high-level control program 520.

For example, when the user double-clicks the icon corresponding to the high-level control program 520 and displayed on the display of the terminal device 50 with a finger or the mouse, the high-level control program 520 corresponding to the double-clicked icon may be executed.

When the high-level control program 520 receives an execution request from the user, the high-level control program 520 may perform user authentication using authentication information received from the user.

In this connection, the user authentication may be performed by matching the authentication information received from the user with pre-stored user-based authentication information for each user who may access the high-level control program.

For example, when the high-level control program 520 receives the execution request from the user, the high-level control program 520 may request the user to enter authentication information. When the authentication of the user is completed based on the authentication information input from the user, the high-level control program 520 may obtain authority information of the user from the memory 52 or server 60.

In one example, an access authority to the high-level control program may include an authority by which the user may execute the high-level control program itself, an authority about the number of low-level control programs that the user may control via the high-level control program, a type thereof or a management function thereof, or an authority about the number of control target devices to be connected via the high-level control program, and a type thereof.

When the high-level control program 520 is executed via a command from the user, the high-level control program 520 may obtain authority information of the user based on authentication information input from user and may control the low-level control program 522 based on the authority information as obtained.

The high-level control program 520 may perform the user authentication by comparing previously stored authentication information for each user with the authentication information received from the user.

Based on the authority information as obtained, the high-level control program 520 may control the access authority to the high-level control program of the authenticated user, thereby allowing the user to control the low-level control program via the high-level control program within an authority range granted to the user.

When the high-level control program 520 obtains the authority information of the user, the high-level control program 520 may display the identification information of the low-level control program corresponding to the authority information and the identification information of the control target device corresponding to the authority information on the display of the terminal device 50.

Further, the high-level control program 520 may search for the low-level control program 522 stored in the terminal device 50 either automatically or via a command received from the user and then install the low-level control program 522 obtained via the search in the memory 52 of the terminal device 50.

The high-level control program 520 may generate an alarm when receiving a report from the low-level control program 522 that the control target device 10 has failed. In this connection, the failure of the control target device 10 may be determined by referring to a pre-stored normal operation range.

For example, the high-level control program 520 may generate an alarm using light or sound via an alarm unit of the terminal device 50 or display an alarm in a form of a message on the display of the terminal device 50.

When the high-level control program 520 has received the report from the low-level control program 522 that an error has occurred in the control target device 10, the high-level control program 520 may identify whether a state value of the control target device 10 is out of a predetermined error range from the normal operation range. The high-level control program 520 may generate an alarm may occur when the state value of the control target device is out of a predetermined error range from the normal operation range.

When the state value of the control target device is out of a predetermined error range from the normal operation range, the high-level control program 520 may control the low-level control program using the most frequent value in a log file of the low-level control program 522.

For example, the high-level control program 520 may control the low-level control program 522 based on the most frequent value in the log file.

Further, when the number of the most frequent values is plural, the high-level control program 520 may control the low-level control program 522 using the most frequent value selected by the user. Further, the high-level control program 520 may search for the low-level control program 522 stored in the terminal device 50 either automatically or via a command received from the user and then may install the low-level control program 522 as obtained via the search in the memory 52 of the terminal device 50.

As such, as used herein, the terms 'storage' and 'installation' of the program are distinguished from each other. Specifically, when the low-level control program 522 is stored in the memory 52, an installation file for installing the low-level control program 522 may be stored in the memory 52. In this connection, the high-level control program 520 may search for and obtain the installation file for installing the low-level control program 522, and then install the low-level control program 522 in the memory 52 using the obtained installation file.

The terminal device 50 may select a specific low-level control program 522 corresponding to a specific control target device 10 based on control target device information received from the communication module, that is, the type of the control target device or the identification number of the control target device or based on setting information preset by the user and received from the server 60. Then, the specific control target device 10 and the specific low-level control program 522 may communicate with each other. In this connection, the setting information preset by the user may include program search setting information previously received from the user, control setting information about the control target device, or monitoring setting information about the control target device.

In one embodiment of the present disclosure, the terminal device 50 may extract the low-level control program connection information corresponding to the control target device identification number from the control target device-based low-level control program connection information received from the server 60, and then may match the specific control target device 10 and the specific low-level control program 522 with each other based on the low-level control program connection information, and may establish communication between the specific control target device 10 and the specific low-level control program 522.

In this connection, low-level control program connection information may include matching unique data about the control target device 10 and low-level control program 522 referenced by the high-level control program 520, a search history of the low-level control program 522 by the high-level control program 520 or a communication establishment history between the low-level control program 522 and the control target device 10, or a control history of the control target device 10.

For example, the server 60 or memory 52 may store and manage the matching unique data of the low-level control program 522, the search history for the low-level control program 522, the communication establishment history, or the control history.

In another embodiment of the present disclosure, the terminal device 50 may match the specific control target device 10 and specific low-level control program 522 with each other based on the user setting information, and may establish communication between the specific control target device 10 and the specific low-level control program 522. In this connection, the user setting information may include preset setting information for each function or for a control target device type that the user wants to manage.

The server 60 may refer to a database, module or device that stores and manages information for providing control target device-based low-level control program connection information to the terminal device 50 such that the high-level control program 520 of the terminal device 50 may establish communication between the specific control target device 10 and the specific low-level control program 522.

The server 60 may pre-store information database regarding the control target device-based low-level control program connection information, or may construct the information database using the control target device-based low-level control program connection information received from the terminal device 50.

In one embodiment of the present disclosure, when the server 60 has previously stored the information database about the control target device-based low-level control program connection information, the server 60 may provide the control target device-based low-level control program connection information to the terminal device 50 so that the high-level control program 520 of the terminal device 50 may establish the communication between the specific control target device 10 and the specific low-level control program 522.

As shown in FIG. 4, one high-level control program 520 may form a hierarchical structure with each of the low-level control programs 522_1 to 522_3 for each of the control target devices 100_1 to 100_3.

For example, the high-level control program 520 may form a hierarchical structure with a low-level control program 522_1 for the control target device 100_1, the low-level control program 522_2 for the control target device 100_2, and the low-level control program 522_3 for the control target device 100_3.

Further, the high-level control program 520 may form a hierarchical structure that establishes communication between one low-level control program 522_1 and a plurality of control target devices 100_1 to 100_3.

The high-level control program 520 and the plurality of the low-level control programs 522_1 to 522_3 form a hierarchical structure. Thus, when the high-level control program 520 communicates with a specific control target device 100_1 to 100_3 among the control target devices, the high-level control program 520 may identify whether there is a specific low-level control program 522_1 corresponding to the specific control target device 100_1 among the low-level control programs 522_1 to 522_3. Then, the high-level control program 520 may establish the communication between the specific control target device 100_1 and the specific low-level control program 522_1 based on the identification result.

In one embodiment of the present disclosure, when there is the specific low-level control program 522_1 corresponding to the specific control target device 100_1 among the plurality of low-level control programs 522_1 to 522_3, the high-level control program 520 may establish communication between the specific control target device 100_1 and the specific low-level control program 522_1. In this connection, the control target device 10 connected with the specific low-level control program 522_1 may include a plurality of control target devices 100_1 to 100_3.

For example, when the high-level control program 520 has a hierarchical structure with the low-level control program 522_1 for the control target device 100_1, and when the high-level control program 520 communicates via the communication module of the control target device 100_1 therewith, the high-level control program 520 may establish communication between the control target device 100_1 and the low-level control program 522_1.

In another embodiment of the present disclosure, when the specific low-level control program 522 corresponding to the specific control target device in the low-level control program 522_1 to 522_3 does not exist, the high-level control program 520 may indicate a download guide message of the low-level control program corresponding to the specific control target device on the display of the terminal device 50.

In another embodiment of the present disclosure, when the high-level control program 520 is not installed in the memory 52 of the terminal device 50, the high-level control program 520 may be installed on the server 60 or an external device (not shown) other than the terminal device 50. In this connection, the user may remotely execute a high-level control program installed on the server 60 or the external device (not shown) using the terminal device 50 communicating with the external device (not shown) or the server 60.

In this connection, the high-level control program 520 remotely controlled by the user using the terminal device 50 may form a hierarchical structure with a plurality of low-level control programs 522_1 to 522_3.

When the low-level control program corresponding to the specific control target device is installed in the terminal device 50, the high-level control program 520 may identify whether the specific low-level control program 522 corresponding to the specific control target device among the low-level control program 522_1 to 522_3 is installed. Then, upon determination that the specific low-level control program 522 corresponding to the specific control target device is installed, the high-level control program 520 may establish the communication between the specific control target device and the specific low-level control program 522.

When in the terminal device 50, the low-level control program 522_3 for the control target device 100_3 is not installed and when the high-level control program 520 communicates with the control target device 100_3 via the communication module of the control target device 100_3, the high-level control program 520 may display a download guide message of the low-level control program 522_3 for the control target device 100_3 on the display of the terminal device 50 because the low-level control program for the control target device 100_3 is not installed in the terminal device 50.

The high-level control program 520 may identify whether the low-level control program for the control target device 100_3 is installed in the terminal device 50. When it is determined that the low-level control program 522_3 corresponding to the control target device 100_3 is installed in the terminal device 50, the high-level control program 520 may establish communication between the control target device 100_3 and the low-level control program 522_3.

The low-level control program 522 may refer to a program that executes management (for example, control or monitoring function) for each of the control target devices 100_1 to 100_3. The low-level control program may correspond to a control target device or a function.

For example, the low-level control programs 522_1 to 522_3 may include a low-level control program 522_1 for the control target device A group, a low-level control program 522_2 for the control target device B group, and a low-level control program 522_3 for the control target device C group.

The low-level control program 522 may obtain a state value of the control target device 10 from the control target device 10. For example, the state value of the control target device may include a current value, voltage value, power value, or frequency value of the control target device.

The low-level control program 522 may determine whether a state value obtained from the control target device 10 in the process of controlling or monitoring the control target device 10 is within a previously stored normal operation range of the control target device 10.

When the state value of the control target device 10 is out of the pre-stored normal operation range, the low-level control program 522 may indicate to the high-level control program that the control target device 10 has failed.

The low-level control program 522 may generate a log file and may save the generated log file to the memory 52 or server 60. In this connection, the low-level control program 522 may share the log file with other devices. For example, the low-level control program 522 may receive a log file generated by another device or transmit the log file to another device.

Further, the low-level control programs 522_1 to 522_3 may include a low-level control program 522_1 that performs a control function for the control target device group A and a low-level control program 522_2 that performs a monitoring function for the control target device group A.

According to one embodiment of the present disclosure, when each of the low-level control programs 522_1 to 522_3 performs a management function for each of a plurality of control target devices, the user does not have to pre-install all of the low-level control programs on the terminal device 50. Rather, after installing only the low-level control program corresponding to the specific control target device to be managed via the high-level control program 520 into the terminal device 50, the user may use the high-level control program 520 to execute the low-level control program.

FIG. 5 shows a configuration of a program and related data stored in the memory of FIG. 4.

Referring to FIG. 5, the memory 52 in FIG. 4 may contain the high-level control program 520 and the low-level control program 522. The processor 54 may refer to a program setting file 62 stored in the server 60 or memory 52.

The processor 54 may communicate with the memory 52 and may execute the high-level control program 520 or the low-level control program 522 installed in the memory 52.

The high-level control program 520 may include a program or a module to establish the communication between the control target device 10 and the low-level control program 522 and to search for and obtain the low-level control program 522 stored in the memory 52 of the terminal device 50.

In another embodiment of the present disclosure, the high-level control program 520 may be installed in an external device (not shown) other than the terminal device 50 or the server 60. In this connection, the high-level control program 520 may search for the low-level control program 522 stored in the memory 52 of the server 60 the external device (not shown) using the connection information 640 of the control target device 10, and may obtain an installation file of the low-level control program 522.

The low-level control program 522 may include a program or module that manages the control target device 10.

In one embodiment of the present disclosure, when the low-level control program 522 is stored in the memory 52 of the terminal device 50, the high-level control program 520 may search for the low-level control program 522 corresponding to the control target device among the plurality of low-level control programs stored in the memory 52 of the terminal device 50 and may obtain the installation file of the discovered low-level control program 522 and install the installation file in the memory 52 of the terminal device 50.

In another embodiment of the present disclosure, where the low-level control program 522 is stored on the server 60, the high-level control program 520 may search for the low-level control program 522 corresponding to the control target device among the plurality of low-level control programs stored in the server 60 and may obtain the installation file of the low-level control program 522 as searched for and install the installation file in the memory 52 of the terminal device 50.

The high-level control program 520 may refer to the identification information 642a of the control target device or the identification information of the low-level control program 522 corresponding to the identification information 642a as included in the matching information 642, thereby to search for the low-level control program 522 corresponding to the identification information 642a among the plurality of low-level control programs stored in the server 60 from the server 60.

In another embodiment of the present disclosure, the high-level control program 520 may refer to the identification information 642a or the information of the low-level control program 522, thereby to search for the low-level control program 522 corresponding to the identification information 642a among the plurality of low-level control programs stored in the memory 52 of the terminal device 50 from the memory 52.

For example, the identification information 642a or program information 642b may include unique information that may identify the low-level control program 522. The identification information 642a may include a control target device type, a control target device group, or a control target device identification number of the control target device 10. The program information 642b may include information about a control function or information about a monitoring function.

In this connection, the high-level control program 520 may search for the low-level control program 522 corresponding to each control target device 10 using the identification information 642a of the control target device 10, and may use the program information 642b to search for the low-level control program 522 based on a control or monitoring function.

The control target device 10 matching with the low-level control program 522 may include a plurality of control target devices. The low-level control program 522 matching with the control target device 10 may include a plurality of low-level control programs.

In detail, the high-level control program 520 may search for the low-level control program 522 corresponding to the control target device 10 in an one-to-one manner or may search for a plurality of low-level control programs based on the connection information 640 or matching information 642 based on the user setting or for each control target device or function.

Based on the execution information 620 generated when the high-level control program 520 is executed, the processor 54 may refer to a first list of the low-level control programs 522 installed in the memory 52 and a second list of low-level control programs 522 corresponding to control target devices within a predefined communication range, thereby determine whether to search for the low-level control program 522 included in the second list.

Specifically, to prevent the searching for or installation of a redundant low-level control program 522, the high-level control program 520 may compare the first list including the pre-installed low-level control programs 522 and the second list including the low-level control programs 522 corresponding to the control target devices 10 existing within the predetermined communication range from the terminal device 50 with each other. Specifically, when the second list is out of range of the first list, the high-level control program 520 may search the server 60 for the low-level control program 522 outside the range of the first list.

For example, when the low-level control program 522 that does not correspond to the low-level control program 522 included in the first list is present among the low-level control programs 522 included in the second list, the high-level control program 520 may search the server 60 for low-level control program 522.

When the second list is entirely included in the first list, the high-level control program 520 may execute the low-level control programs 522 included in the first list based on the execution information 620 of the high-level control program 520. In detail, when all of the low-level control programs 522 included in the second list are included in the low-level control programs 522 included in the first list, the high-level control program 520 may not search the server 60 for the low-level control program 522 but may execute the low-level control program 522 stored in the memory 52.

The high-level control program 520 may obtain the low-level control program 522 searched from the server 60 based on the search information 680 from the server 60 and install the obtained program in the memory 52.

Further, the high-level control program 520 may obtain an installation file of the low-level control program 522 searched from the memory 52 based on the search information 680 and install the installation file in the memory 52.

For example, the high-level control program 520 may obtain, from the server 60 or memory 52, the installation file of the searched low-level control program 522 based on the search information 680 generated from the search result of the high-level control program 520 and may install the installation file in the memory 52. In this connection, the search information 680 may include a list of low-level control programs 522 based on a search history, a search path, the number of searches or a search result.

Further, the high-level control program 520 may obtain the installation file of the low-level control program 522 searched from the memory 52 of the terminal device 50 based on the search information 680 from the memory 52 and transfers the low-level control program 522 to the memory 52.

The program setting file 62 may be referred to by the high-level control program 520 when the high-level control program 520 is executed by the processor 54. For example, the program setting file 62 may include execution information 620, connection information 640, matching information 642, identification information 642a, program information 642b, access information 660, and search information 680.

The execution information 620 may refer to data generated when the high-level control program 520 or the low-level control program 522 is executed in the terminal device 50. For example, the execution information 620 may include command data as set by a user. In this connection, the command data may include a search command, an installation command, an execution command, a control command, or a monitoring command.

The connection information 640 may refer to communication data necessary for the terminal device 50 to perform communication establishment with the control target device 10. For example, the connection information 640 may include matching information 642, identification information 642a, and program information 642b.

The matching information 642 may refer to data necessary for matching the control target device 10 and the low-level control program 522 with each other. Specifically, the matching information 642 may be generated by matching the identification information 642a or the program information 642b with the low-level control program 522 based on a predetermined criterion and may be stored in the server 60 in advance For example, the matching information 642 may include the identification information 642a of the control target device 10, the identification data of the low-level control program 522 for managing the control target device 10, or the identification data of the high-level control program 520 searching for the low-level control program 522.

The identification information 642a may refer to data required for identifying the control target device 10. Specifically, the control target device 10 may include unique identification information 642a based on the control target device type, the control target device group, or the installation information.

The identification information 642a may be used for matching the control target device 10 and low-level control program 522 with each other and for establishing communication therebetween. For example, the control target device 10 and the low-level control program 522 may be matched with each other based on the matching information 642 including the matching data generated by matching the identification information 642a of the control target device 10 and the low-level control program 522 with each other.

In this connection, the installation information may include the number of the control target devices 10 as installed, the installation locations or unique installation data predetermined from the user.

The program information 642b may refer to information about a program that the terminal device 50 controls, searches for, installs or executes. For example, the program information 642b may include a type of a program, a unique number of the program, command data included in the program, and corresponding data to the control target device. In this connection, the program information 642b may include information of the high-level control program 520 and information of the low-level control program 522.

The access information 660 may refer to data that manages an access via the communication between the control target device 10 and the terminal device 50. For example, the access information 660 may include an access history to the control target device 10 and the high-level control program 520, a program execution history, a program installation history, or a program search history of the low-level control program 522.

The search information 680 may refer to data necessary to execute searching for the low-level control program 522 as executed by the high-level control program 520 or to store the search result.

For example, the search information 680 may include a search history, a search success history, a list of low-level control programs matching the control target device 10, or a list of low-level control programs matching the control or monitoring function.

Further, the program setting file 62 may generate and store authentication information for authenticating the user executing the high-level control program 520 or authority information of the user corresponding to the authentication information of the user. In this connection, the authentication information or authority information may be generated on the server 60 or an external device (not shown), or may be stored therein.

The authentication information may include user specific information including a predetermined N-digit encryption key, fingerprint recognition, iris recognition, or voice recognition data.

Further, the authority information may include the access authority of the user to the high-level control program corresponding to the user's authentication information. the authority information may set differently an authority of a user based on a control target device, based on a low-level control program corresponding to a control target device, or based on a function of a low-level control program corresponding to a control target device.

For example, an access authority to the high-level control program may include an authority by which the user may execute the high-level control program itself, an authority about the number of low-level control programs that the user may control via the high-level control program, a type thereof or a management function thereof, or an authority about the number of control target devices to be connected via the high-level control program, and a type thereof.

The program setting file 62 may store therein the normal operation range information of the state value of the control target device 10 and the log file of the low-level control program.

The normal operation range information of the state value may store therein information of the state value for the normal operation of the control target device 10. For example, when a range in which the control target device 10 is in a normal operation state is in a range of 10V to 20V, the normal operation range information of the voltage value may store therein a range of 10V to 20V of the voltage value corresponding to the control target device 10 as the normal operation range information.

The normal operation range information may be received from the user or server 60, or may be generated or stored while the low-level control program 522 controls or monitors the control target device 10.

Further, the normal operation range of the control target device 10 included in the normal operation range information may be generated and stored differently between users logged into the high-level control program 520 for the plurality of users.

For example, when a user A logs into the high-level control program 520 and monitors the control target device 10 via the low-level control program 522, and when the voltage value of the control target device 10 is in a range of 15V to 25V which is different from the normal operation range of 10V to 20V, the user A may set the voltage value range 15V to 25V as the normal operation range, or repeatedly generate an alarm based on the normal operation range 10V to 20V. In this case, the low-level control program 522 may set the voltage value range 15V to 25V to the normal operation range for the user A and generate and store the normal operation range.

For example, when a user B logs into the high-level control program 520 and monitors the control target device 10 via the low-level control program 522, the voltage value of the control target device 10 is in a range of 10V to 20V which is a normal operation range. In this case, when the user B performs repeated control operations (e.g., voltage blocking operations) at the voltage value in the range of 10V to 20V, the low-level control program 522 may report to the high-level control program 520 to provide an alarm or message to the user B when the voltage value is in the 10V to 20V range.

The log file may store therein an event occurring while the low-level control program 522 is executed, for example, a control history, and a message, for example, a state value of the control target device. The log file may be generated and stored while the low-level control program 522 is executed, or may be received from another device or the server 60.

The communicator 56 may transmit a connection request signal to the control target device based on the execution information 620 of the high-level control program 520. Specifically, when the high-level control program 520 is executed in the terminal device 50, the communicator 56 may transmit the connection request signal to the control target device based on the execution information 620 generated by the high-level control program 520 and may receive the connection information 640 from the control target device receiving the connection request signal.

For example, the execution information 620 may include a search command for a control target device, a communication establishment command, or a search command for a low-level control program. In this connection, the connection request signal may be transmitted via a wired or wireless communication scheme to allow communication with the control target device 10 or a communication module within a predetermined communication range.

The communicator 56 may communicate with the control target device with reference to the identification information 642a of the control target device or the access information 660 to the control target device included in the connection information 640. In this connection, the communicator 56 may receive the connection information 640 from the control target device.

For example, the identification information 642a included in the connection information 640 may include a control target device type, a control target device group, or a control target device identification number. Further, the access information 660 may include communication history information between the control target device and the program control device. In this connection, the communication history information may include the number of communications or whether communication is successful.

When the high-level control program 520 is executed on the terminal device 50 including the high-level control program 520, the high-level control program 520 is executed automatically or via a command received from the user, based on the information stored in the program setting file 62, such that the high-level control program 520 may search for, install, and execute the low-level control program 522.

Hereinafter, the execution process of the high-level control program 520 of the terminal device 50 according to the present disclosure will be described in detail with reference to specific embodiments.

FIG. 6 is a flow chart of ab execution of a high-level control program implemented using a terminal device according to one embodiment of the present disclosure.

Referring to FIG. 6, the high-level control program 520 may receive a search request for the control target device 10 from the user via the terminal device 50 S100. In detail, the receiving of the search request may include may receiving a search request from the user to request the high-level control program 520 to search for the low-level control program 522 in response to the reception of the request, or a search request to request the high-level control program 520 automatically to search for the low-level control program 522 according to pre-stored search information.

For example, the search request may include a control target device type or a control target device identification number of the control target device to be searched. Further, the previously stored search information may include an automatic search period, an automatic search count, or the search request received from the user.

Subsequently, the communicator 56 of the terminal device 50 may transmit a connection request signal to the control target device according to the search request. In detail, the high-level control program 520 may transmit the connection request signal via the communicator 56 for the control target device to generate and transmit the connection information 640 according to the search request received from the user.

Subsequently, the communicator 56 of the terminal device 50 may receive the connection information 640 from the control target device 10 S110. Specifically, when the control target device 10 within the predetermined communication range from the terminal device 50 receives the connection request signal, the control target device 10 may generate the connection information 640 and transmit the same to the terminal device 50.

Further, even when the control target device 10 does not receive the connection request signal, the control target device 10 may generate the connection information 640 according to a preset period revived from the user and transmit the generated connection information 640 to the terminal device 50.

Subsequently, the high-level control program 520 may display the search result information on the display of the terminal device 50 S115. In detail, the high-level control program 520 may provide search result information including the searched control target device, whether the low-level control program 522 corresponding to the searched control target device 10 is installed, and update information of the low-level control program 522.

For example, when the high-level control program 520 is executed in the terminal device 50, the high-level control program 520 may provide a list of control target devices that have sent the connection information 640, or whether the low-level control program 522 corresponding to the control target device transmitting the connection information 640 is installed in the terminal device 50.

Further, the high-level control program 520 may display update information including an update date, update requirement or non-requirement or update availability of the low-level control program 522 installed in the terminal device 50 on the display of the terminal device 50.

The high-level control program 520 may then search the server 60 for a low-level control program 522 S120. In detail, the high-level control program 520 may search for the low-level control program 522 matching the connection information 640 among the low-level control programs 522 stored in the server 60 with reference to the connection information 640.

In another embodiment of the present disclosure, when the low-level control program 522 is stored in the memory 52 of the terminal device 50, the high-level control program 520 may search for the low-level control program 522 stored in the memory 52 of the terminal device 50. In detail, the high-level control program 520 may refer to the connection information 640 to search for an installation file of the low-level control program 522 matching with the connection information 640 among the installation files of the low-level control programs 522 stored in the memory 52 of the terminal device 50.

Then, the high-level control program 520 may obtain the low-level control program 522 as found from the server 60 S215. Specifically, when the low-level control program 522 is found from the server 60 by the high-level control program 520, the high-level control program 520 may obtain an installation file of the low-level control program 522 retrieved from server 60.

In another embodiment of the present disclosure, when the low-level control program 522 is stored in the memory 52 of the terminal device 50, the high-level control program 520 may obtain an installation file of the low-level control program 522 retrieved from the memory 52.

Then, the high-level control program 520 may install the obtained low-level control program 522 in the memory 52 of the terminal device 50 S130. In detail, the high-level control program 520 may install the low-level control program 522 in the memory 52 of the terminal device 50 using the installation file of the low-level control program 522 as obtained from the server 60 or the memory 52.

Subsequently, the terminal device 50 may transmit a control or monitoring signal to the control target device 10 S135. Specifically, when the high-level control program 520 or low-level control program 522 is executed by the processor 54 in the terminal device 50, the communicator 56 may send a control or monitoring signal to the specific control target device that the user want to control or monitor.

Subsequently, the terminal device 50 may receive control or monitoring information from the control target device 10 S140. Specifically, the specific control target device receiving the control or monitoring signal may transmit control or monitoring information including the control value or the monitoring value to the communicator 56 of the terminal device 50. In this connection, the high-level control program 520 or low-level control program 522 may receive the control or monitoring information and display the same on the display of the terminal device 50.

FIG. 7 illustrates an execution process of a high-level control program implemented using a terminal device according to some embodiments of the present disclosure.

Referring to FIG. 7, first, the high-level control program 520 installed in the terminal device 50 may be executed by the user S200. For example, when a user double-clicks an icon corresponding to the high-level control program 520 and displayed on the display of the terminal device 50 with a finger or a mouse, the high-level control program 520 corresponding to the double-clicked icon may be executed.

In another embodiment of the present disclosure, when the high-level control program 520 is installed on an external device (not shown) other than the terminal device 50 and or on the server 60, the high-level control program 520 may be executed by remote control of the user using the terminal device 50 in communication with the external device (not shown) or the server 60.

The high-level control program 520 may then search for the control target device 10 and provide a search message S215. In detail, the high-level control program 520 may receive the connection information 640 from the control target device 10 within the predetermined communication range from the terminal device 50. Alternatively, the high-level control program 520 may transmit the connection request signal to the control target device 10 which in turn transmits the connection information 640 to the high-level control program 520 in response to the connection request signal as received from the high-level control program 520.

In this connection, receiving the connection information 640 or transmitting the connection request signal may be automatically executed based on preset reception or transmission information, or may be executed via request information received from a user.

Subsequently, the high-level control program 520 may install the low-level control program 522 corresponding to the searched control target device 10 and may provide the installation message S235.

When the installation of the low-level control program is completed, the high-level control program 520 may create an icon corresponding to the newly installed low-level control program 522 and display the icon on the display of the control target device 10.

FIG. 8 is a diagram for describing a process of executing a high-level control program implemented using a terminal device according to an embodiment of the present disclosure.

Referring to FIG. 8, the high-level control program 520 may receive a control target device type S330 or a control target device identification number S350 from the user based on a search mode setting S310 as received from the user.

In this connection, the control target device type or control target device identification number may include a unique identification code predetermined to identify the control target device.

For example, the high-level control program 520 receives the control target device type or control target device identification number from the user and then search for the specific control target device corresponding to the specific control target device type or the specific control target device identification number.

The high-level control program 520 may then receive a search start command S370 from the user. In this connection, the high-level control program 520 may start, stop, or end the search according to the search start command received from the user.

FIG. 9 is a diagram for describing a process of executing a high-level control program implemented using a terminal device according to another embodiment of the present disclosure.

Referring to FIG. 9, first, the high-level control program 520 installed in the terminal device 50 may be executed by the user S400. For example, when a user double-clicks the icon corresponding to the high-level control program 520 and displayed on the display of the terminal device 50 with a finger or a mouse, the high-level control program 520 corresponding to the double-clicked icon may be executed. In this connection, the icon corresponding to the high-level control program 520 and the icon corresponding to the low-level control program 522 may be displayed to be distinguished from each other.

In another embodiment of the present disclosure, when the high-level control program 520 is installed on an external device (not shown) other than the terminal device 50 and on the server 60, the high-level control program 520 may be executed via remote control of the user using the terminal device 50 in communication with the external device (not shown) or the server 60. The high-level control program 520 may then search for the control target device 10 and then identify and display the installation or non-installation of the low-level control program 522 corresponding to the detected control target device S410. In detail, the high-level control program 520 may receive the connection information 640 from the control target device 10 within the predetermined communication range from the terminal device 50. Alternatively, the high-level control program 520 may transmit the connection request signal to the control target device 10, and may receive the connection information 640 from the control target device 10 in response to the connection request signal.

For example, the search result information S415 displayed on the display of the terminal device 50 may include a list of the control target devices that sent the connection information 640 and whether a low-level control program corresponding to the control target device that sent the connection information 640 is installed.

In this connection, the high-level control program 520 may display a list of control target devices that have sent the connection information 640. Further, the high-level control program 520 may identify whether the low-level control program corresponding to the control target device that has transmitted the connection information 640 is installed in the terminal device 50, and may indicate the installation and non-installation thereof in the list.

Further, the search result information S415 displayed on the display of the terminal device 50 may include update information of the low-level control program. Specifically, the update information may include update requirement or non-requirement, update availability, or an existing update date of the low-level control program installed in the terminal device 50. The high-level control program may update the low-level control program.

For example, when a user double-clicks the update icon (not shown) corresponding to the low-level control program 522 shown on the display of the terminal device 50 with a finger or a mouse, the low-level control program 522 corresponding to the double-clicked update icon may be updated.

Further, the high-level control program 520 may execute a low-level control program 522 corresponding to the control target device 10 displayed on the display of the terminal device 50.

For example, when a user double-clicks, with a finger or mouse, a list of the control target devices A101 displayed on the display of terminal device 50, the low-level control program 522_1 corresponding to the list of the control target device A101 as double-clicked may be executed by the high-level control program 520.

Subsequently, the high-level control program 520 may install the low-level control program 522 automatically or according to the installation request received from the user and may display the installation message S435 including a name of the low-level control program currently being installed S430.

In one example, when the user double-clicks a installation and non-installation field for the low-level control program corresponding to the control target devices A102 in the search result information, the high-level control program 520 may display an installation message S435 while installing the low-level control program corresponding to the control target device A102 as double-clicked by the user. In another example, the high-level control program 520 may automatically install a low-level control program corresponding to a control target device A102, B102, or B103 corresponding to a low-level control program as not installed in the search result information regardless of the user's request.

When the installation of the low-level control program is completed, the high-level control program 520 may create an icon corresponding to the newly installed low-level control program and display the same on the display of the control target device 10.

FIG. 10 is a flowchart of an execution process of a high-level control program and a low-level control program as implemented using a terminal device according to an embodiment of the present disclosure.

Referring to FIG. 10, the low-level control program 522 may obtain the state value of the control target device S500. For example, the state value of the control target device may include a current value, voltage value, power value, or frequency value of the control target device.

Subsequently, the low-level control program 522 may determine whether the state value of the control target device is contained in the predefined normal operation range S510. In detail, the low-level control program 522 may determine whether a state value obtained from the control target device in a process of controlling or monitoring the control target device is within a previously stored normal operation range of the control target device.

For example, the low-level control program 522 may use the normal operation range of the control target device stored in the server 60 or memory 52 to determine whether the state value of the control target device is within the predefined normal operation range via comparing the current state value with the normal operation range.

Then, when the state value of the control target device is out of the normal operation range, the low-level control program 522 may report the abnormal state of the control target device to the high-level control program.

Subsequently, the high-level control program 520 may generate an alarm when the high-level control program 520 has received from the low-level control program the report that an error has occurred in the control target device S 520. In this connection, the high-level control program 520 may identify whether the state value of the control target device is outside the predetermined error range from the normal operation range. The high-level control program 520 may issue an alarm when the state value of the control target device is out of the error range.

For example, when the state value of the control target device is outside the predetermined error range from the normal operation range, the high-level control program 520 may indicate the normal operation range and the current state value of the control target device on the display of the terminal device 50. Further, the high-level control program 520 may provide a message together with an alarm to the user to recommend the user to control the low-level control program 522 based on the most frequent value in the log file of the low-level control program 522.

For example, when the voltage value of the control target device 10 is out of the predetermined error range by 5V, the high-level control program 520 may provide a message to the user to recommend the user to block the voltage based on the most frequent value of the low-level control program 522. In this case, when the voltage value of the control target device 10 is out of the predetermined error range by 5V, the most frequent value may relate to the voltage blocking control operation.

In this connection, the high-level control program 520 may receive a normal operation range or error range from the user or a normal operation range or error range from the server 60.

Then, when the state value of the control target device is out of the normal operation range, the high-level control program 520 may control the low-level control program using the most frequent value in the log file of the low-level control program.

Specifically, the log file of the low-level control program 522 may refer to data that stores an event occurring during the execution of the low-level control program 522, for example, a control history, and a message, for example, a state value of the control target device.

Further, the low-level control program 522 may receive the log file of the low-level control program generated by another device. When using the log file of another user or another low-level control program created on another device, the low-level control program 522 may perform precise or appropriate control over the state value of the control target device.

Further, the most frequent value may mean control history data that is stored most frequently compared to other control history data among control history data of the low-level control program included in the log file.

For example, when the voltage value of the control target device has a 20V by 5V from and outside the normal operation range (for example, 10V to 15V), and when the low-level control program performed a control operation 10 times to decrease the voltage value by 10 V and a control operation 5 times to decrease the voltage value by 5 V, the most frequent value may refer to the control history data in which the low-level control program lowers the voltage value of the control target device by 10V.

The high-level control program 520 may determine whether the number of the most frequent values is plural. For example, in the above example, when the low-level control program performs 10 times the control of decreasing the voltage value by 10 V and 10 times the control of decreasing the voltage value by 5V, the number of the most frequent values may be 2.

When the number of the most frequent values is plural, the high-level control program 520 may receive the most frequent value that the user wants to execute from among the plurality of most frequent values S535. For example, in the above example, when the low-level control program performs 10 times the operation of controlling the voltage value down by 10 V and 10 times the operation of controlling the voltage value down by 5V, that is, the number of the most frequent values is plural, the high-level control program 520 may receive the most frequent value in which the low-level control program lowers the voltage value by 5V from the user.

Subsequently, the high-level control program 520 may control the low-level control program 522 using the most frequent value selected from the user among the plurality of most frequent values, or the single most frequent value S540. For example, the high-level control program 520 may control the control target device via the low-level control program 522, and may not execute the low-level control program 522 depending on the most frequent value as selected.

The low-level control program 522 may then store the control history in the log file S550. For example, the low-level control program 522 may accumulate and store the most frequent value and the control history according to the most frequent value in the log file and may share the log file with other devices.

FIG. 11 illustrates a process of establishing communication between a control target device and a low-level control program as implemented using a terminal device according to some embodiments of the present disclosure.

Referring to FIG. 11, the high-level control program 520 may store in the memory 52 the identification information 642a_1 of the control target device A and the identification information 642a_2 of the control target device B. The terminal device 50 where the low-level control program A 522_a is installed may communicate with the control target device A 10_a or the control target device B 10_b.

The identification information of the control target device may be received from the control target device while the high-level control program is installing a low-level control program corresponding to the control target device into the memory 52 or the high-level control program is searching for the control target device, and then may be stored in the memory 52.

First, the high-level control program 520 may use the identification information 642a_1 and 642a_2 of the control target device stored in the memory 52 in advance to attempt to establish the communication between the control target device A 10_a or control target device B 10_b and the low-level control program A 522_a.

In this connection, the high-level control program 520 may use the identification information 642a_1 of the control target device A to quickly establish the communication between the control target device A 10_a and the low-level control program A 522_a without receiving the identification information from the control target device A 10_a.

When the low-level control program B is deleted or modified and thus is not present in the memory 52, the high-level control program 520 may acquire the low-level control program B from the server 60 or memory 52 and install the acquired low-level control program B into the memory 52.

When the high-level control program 520 does not establish the communicating with the control target device B 10_*b* using the identification information 642*a*_2 of the control target device B, the high-level control program 520 may use the identification information 642*a*_2 of the control target device B to obtain the low-level control program B from the server 60 or the memory 52.

FIG. 12 is a diagram for describing a process of establishing communication between a control target device and a low-level control program as implemented using a terminal device according to an embodiment of the present disclosure.

Referring to FIG. 12, the high-level control program 520 may store in the memory 52 the identification information 642*a*_1 of the control target device A and the identification information 642*a*_2 of the control target device B. Then, the terminal device 50 where the low-level control program A 522_*a* and the low-level control program B 522_*b* are installed may communicate with the control target device A 10_*a* or the control target device C 10.

The identification information of the control target device may be received from the control target device while the high-level control program is installing a low-level control program corresponding to the control target device into the memory 52 or the high-level control program is searching for the control target device, and then may be stored in the memory 52.

First, the high-level control program 520 may use the identification information 642*a*_1 and 642*a*_2 of the control target device stored in the memory 52 in advance to attempt to establish the communication between the control target device A 10_*a* or the control target device C 10_*c* and the low-level control program A 522_*a* or the low-level control program B 522_*b*.

In this connection, the high-level control program 520 may use the identification information 642*a*_1 of the control target device A to quickly establish the communication between the control target device A 10_*a* and the low-level control program A 522_*a* without receiving the identification information from the control target device A 10_*a*.

When the high-level control program 520 does not communicate with the control target device C 10_*c* using the identification information 642*a*_1 and 642*a*_2 of the control target device, the high-level control program 520 may search for the control target device C 10_*c*.

The high-level control program 520 may search for the control target device C 10_*c* upon receiving a search request from the user. Alternatively, the high-level control program 520 may first receive the identification information of the control target device C from the control target device C 10_*c* and then search for the control target device C 10_*c*.

The high-level control program 520 may acquire the low-level control program C from the server 60 or the memory 52 using the identification information of the searched control target device C.

FIG. 13 is a diagram for describing a process of establishing communication between a control target device and a low-level control program implemented using a terminal device according to another embodiment of the present disclosure.

Referring to FIG. 13, the high-level control program 520 may store in the memory 52 the identification information 642*a*_1 of the control target device A and identification information 642*a*_2 of the control target device B. Then, the terminal device 50 where the low-level control program A 522_*a* and the low-level control program B 522_*b* are installed may establish the communication with the control target device A 10_*a*, the control target device B 10_*b*, or the control target device C 10_*c*.

The identification information of the control target device may be received from the control target device while the high-level control program is installing a low-level control program corresponding to the control target device into the memory 52 or the high-level control program is searching for the control target device, and then may be stored in the memory 52.

First, the high-level control program 520 may use the identification information 642*a*_1 and 642*a*_2 of the control target device stored in the memory 52 in advance to attempt to establish the communication between the control target device A 10_*a*, control target device B 10_*b* or control target device C 10_*c* and the low-level control program A 522_*a* or low-level control program B 522_*b*.

In this connection, the high-level control program 520 may use the identification information 642*a*_1 of the control target device A and the identification information 642*a*_2 of the control target device B to quickly establish the communication between the control target device A 10_*a* and low-level control program A 522_*a* and establish the communication between the control target device B 10_*b* and the low-level control program B 522_*b*, without receiving the identification information from the control target device A 10_*a* and control target device B 10_*b*.

The high-level control program 520 may receive a search request from the user to search for the control target device C 10_*c*. Alternatively, the high-level control program 520 may receive the identification information of the control target device C from the control target device C 10_*c* when the identification information of the control target device C is not stored in the memory 52.

FIG. 14 illustrates an execution process of a high-level control program as implemented using a terminal device according to another embodiment of the present disclosure.

Referring to FIG. 14, the high-level control programs 520_1, 520_2, and 520_3 respectively installed in the plurality of terminal devices 50_1, 50_2, and 50_3 may communicate with the control target device 10 or server 60 and may establish communications between the control target device 10 and the low-level control programs 522_1, 522_2, and 522_3.

The high-level control programs 520_1, 520_2, and 520_3 may perform user authentication when the user wants to manage the control target device 10 via a plurality of low-level control programs 522_1, 522_2, and 522_3.

In this connection, the user authentication may be performed by matching the authentication information received from the user with the pre-stored authentication information for each user who may access the high-level control program.

For example, when a user executes the high-level control programs 520_1, 520_2, and 520_3, the high-level control programs 520_1, 520_2, and 520_3 may request the user to enter authentication information. When the authentication of the user is completed based on the authentication information input from the user, the authority information of the user may be obtained from the memory 52 or server 60.

In this connection, the authentication information may include user specific information including a predetermined N-digit encryption key, fingerprint recognition, iris recognition, or voice recognition data.

Further, the authority information may include the access authority of the user to the high-level control program corresponding to the user's authentication information. the authority information may set differently an authority of a user based on a control target device, based on a low-level control program corresponding to a control target device, or based on a function of a low-level control program corresponding to a control target device.

For example, an access authority to the high-level control program may include an authority by which the user may execute the high-level control program itself, an authority about the number of low-level control programs that the user may control via the high-level control program, a type thereof or a management function thereof, or an authority about the number of control target devices to be connected via the high-level control program, and a type thereof.

The high-level control program 520 may transmit the authentication information of the authenticated user to the memory 52 or the server 60 and then obtain authority information of the user corresponding to the authentication information of the authenticated user.

The high-level control program 520 controls the access authority to the high-level control program from the authenticated user based on the authority information as obtained to allow the user to control the low-level control program via the high-level control program within the authority range as granted to the user.

In one embodiment of the present disclosure, when the terminal device 50_1, the terminal device 50_2, and the terminal device 50_3 are used by different users, a user using the terminal device 50_1 may have an authority to execute the high-level control program 520_1, a user using the terminal device 50_2 may not have an authority to execute the high-level control program 520_2.

Further, all of the low-level control program 522_1, low-level control program 522_2, and low-level control program 522_3 may control the control target device 10. For example, the low-level control programs may be divided into a program that may control a control target device and a program that may only monitor the control target device based on the function. In this case, only an authority to monitor the control target device 10 may be allocated to a user using the terminal device 50_3.

In this case, the user using the terminal device 50_3 cannot execute the control function of the low-level control program 522_3 even when the user has the authority to execute the high-level control program 520_3, but may execute only the monitoring function of the low-level control program 522_3.

FIG. 15 is a diagram for describing a process of executing a high-level control program as implemented using a terminal device according to another embodiment of the present disclosure.

Referring to FIG. 15, the high-level control program 520 installed in the terminal device 50 may communicate with the control target devices 10_1, 10_2, and 10_3 or server 60 and may establish communications between the control target devices 10_1, 10_2, and 10_3 and the low-level control program 522.

When a user using the terminal device 50 wants to manage the control target device 10_1, the control target device 102, or the control target device 10_3 via the low-level control program 522, the high-level control program 520 may perform user authentication.

The high-level control program 520 may transmit the authentication information of the authenticated user to the memory 52 or the server 60 and thus obtain authority information of the user corresponding to the authentication information of the authenticated user.

The high-level control program 520 may control access authority to the high-level control program by the authenticated user based on the authority information as obtained to allow the user to control the low-level control program 522 via the high-level control program 520 within the authority range assigned to the user.

The user using the terminal device 50_3 may be given an authority about the number or type of the control target devices that may communicate with the terminal device 50_3 via the high-level control program.

In one embodiment of the present disclosure, 2 of a maximum number of control target devices that may establish the communication with the terminal device 50_3 via the high-level control program may be allocated to a user using the terminal device 50_3. The type of the control target devices that may establish the communication with the terminal device 50_3 via the high-level control program as allocated to a user using the terminal device 50_3 may be of the A group.

For example, the control target device 10_1 may be of a group A, the control target device 10_2 may be of a group B, and the control target device 10_3 may be of the group C.

In this connection, the user using the terminal device 50_3 has the authority to execute the high-level control program 520_3. 2 of a maximum number of control target devices that may establish the communication with the terminal device 50_3 via the high-level control program may be allocated to a user using the terminal device 50_3. Thus, the terminal device 50_3 may not communicate with all of the control target device 10_1, control target device 102, and control target device 10_3. Rather, the terminal device 50_3 may establish communications with at most two control target devices of the control target device 10_1, the control target device 10_2, and the control target device 10_3.

Further, the type of the control target devices that may establish the communication with the terminal device 50_3 via the high-level control program as allocated to a user using the terminal device 50_3 may be of the A group. Thus, the user using the terminal device 50_3 cannot establish the communication with the B group control target device 10_2 and the C group control target device 10_3, and may only establish the communication with the A group control target device 10_1.

FIG. 16 illustrates an execution process of a high-level control program as implemented using a terminal device according to another embodiment of the present disclosure.

Referring to FIG. 16, when authentication of the user is completed based on the authentication information received from the user, the high-level control program 520 may obtain the authority information of the user and control the low-level control program 522 based on the obtained authority information.

When the high-level control program 520 obtains the authority information of the user, the high-level control program 520 may provide the identification information of the low-level control program and identification information of the control target device corresponding to the authority information. In this connection, the identification information of the low-level control program and identification information of the control target device corresponding to the authority information may include data that may identify the user's authority related to the low-level control program and control target device.

For example, the high-level control program 520 may display an identification number of the control target device, an identification number of the low-level control program corresponding to the authority information of the user as obtained from the server 60 or the memory 52, whether the low-level control program is installed, a managing function of the low-level control program, or the authority of the authenticated user, for example, access blocking, control or monitoring on the display of the terminal device 50.

For example, the user may be prevented from accessing the control target device A101 and the control target device B103. In this connection, the user cannot control the control target device A101 even when the low-level control program for controlling the control target device A101 is installed in the terminal device 50.

Further, the user has authority to control the control target device A102, but the low-level control program for controlling the control target device A102 is not installed in the terminal device 50. In this case, the user may not control the control target device A102. In this case, the user may obtain and install the low-level control program that controls the control target device A102.

Further, the user may have an authority to control the control target device B101. However, the control target device B101 cannot be controlled by the user because a low-level control program that may monitor only the control target device B101 is installed in the terminal device 50. In this case, the user may acquire and install a low-level control program that controls the control target device B101.

Further, the user may have an authority to monitor the control target device B102. In this connection, the user may not control the control target device B102 even when a low-level control program which may control the control target device B102 is installed in the terminal device 50. Rather, the user may monitor the control target device B102.

When the user wants to execute the low-level control program 522 after displaying the authority information on the display of the terminal device 50, the high-level control program 520 may execute a first authentication performed when executing the high-level control program 520 and then a second authentication performed when executing the low-level control program.

When the high-level control program 520 receives an execution request of the low-level control program from the user, the high-level control program 520 may request the user to input the authentication information. When the authentication of the user is completed based on the input authentication information, the high-level control program 520 may execute the low-level control program as selected by the user.

According to the present disclosure as described so far, a user may easily install a control program suitable for each control target device without directly identifying a type of the control target device or the control program.

Further, in accordance with the present disclosure, a user may easily identify whether each control program is installed or a location of an execution button or icon of each control program as the number of control programs as installed increases.

Further, in accordance with the present disclosure, the control program execution method may easily set an user's authority for each control program or each function of each control program.

Further, in accordance with the present disclosure, the control program execution method may facilitate management of a user's authority over a plurality of control programs.

Further, in accordance with the present disclosure, the control program execution method may identify whether updating of the control program corresponding to each control target device is required, and when so, may easily update the control program.

Further, in accordance with the present disclosure, a user may quickly identify a control target device corresponding to the installed control program, and easily execute the control program.

Further, in accordance with the present disclosure, the control program execution method may identify whether a control target device is in a normal operation state based on a change in a state value of the control target device, and may easily control the control program.

Further, in accordance with the present disclosure, the control program execution method may control a control program appropriately depending on a state value of a control target device. The present disclosure as described above may be subjected to various substitutions, modifications, and changes by a person having ordinary knowledge in the technical field to which the present disclosure belongs without departing from the technical spirit of the present disclosure. Thus, the present disclosure is not limited by the accompanying drawings.

What is claimed is:

1. A method for executing a control program by a terminal device, wherein at least one of a low-level control program for managing a control target device or a high-level control program for executing the low-level control program is included in the terminal device, wherein the method comprises:
   receiving an execution request of a high-level control program from a user;
   executing the high-level control program in response to the execution request and searching for a control target device by the high-level control program;
   receiving identification information of the searched control target device, and searching for a low-level control program corresponding to the identification information; and
   establishing communication between the searched low-level control program and the searched control target device,
   wherein the high-level control program is first executed and then the low-level control program is executed,
   wherein the method further comprises:
   acquiring a state value of the control target device by the low-level control program;
   determining, by the low-level control program, whether the state value is contained in a predefined normal operation range; and
   upon determination by the low-level control program that the state value is out of the normal operation range, reporting, by the low-level control program, to the high-level control program that the control target device is in an abnormal state.

2. The method of claim 1, wherein receiving the execution request of the high-level control program includes:
   performing user authentication based on authentication information received from the user;
   obtaining authority information of the user for which authentication has been completed; and
   managing the low-level control program based on the obtained authority information.

3. The method of claim 2, wherein the method further comprises:
   when the high-level control program obtains the authority information of the user, providing, from the high-level control program to the terminal device, identification information of the low-level control program corresponding to the authority information, and identification information of the control target device corresponding to the authority information.

4. The method of claim 1, wherein searching for the control target device includes:
   acquiring the identification information pre-stored in the terminal device; and
   receiving the identification information from the control target device.

5. The method of claim 4, wherein receiving the identification information from the control target device includes:
   receiving a search request for the control target device from the user; and
   transmitting a connection request signal to the control target device in response to the search request.

6. The method of claim 5, wherein the method further comprises:
   generating, by the control target device, the identification information based on the connection request signal; and
   transmitting, by the control target device, the identification information to the terminal device.

7. The method of claim 1, wherein searching for the low-level control program includes:
   searching the low-level control program pre-stored in the terminal device;
   acquiring the low-level control program from the terminal device or a server; and
   installing the acquired low-level control program into the terminal device.

8. The method of claim 1, wherein the method further comprises providing search result information including the identification information of the searched control target device, installation information of the low-level control program corresponding to the control target device, or update information of the low-level control program.

9. The method of claim 8, wherein the method further comprises updating the low-level control program based on the update information in the search result information, or installing or executing the low-level control program based on the installation information in the search result information.

10. The method of claim 1, wherein the method further comprises:
    identifying, by the high-level control program, whether the state value is outside a predetermined error range from the normal operation range; and
    generating, by the high-level control program, an alarm when the state value is out of the error range.

11. The method of claim 10, wherein the method further comprises: differently setting, by the high-level control program, whether the alarm is generated or the normal operation range or the error range for different users, and based on login information of the users logged into the high-level control program.

12. The method of claim 10, wherein the method further comprises:
    when the state value is outside the normal operation range, managing, by the high-level control program, the low-level control program based on a most frequent value in a log file of the low-level control program.

* * * * *